(12) United States Patent
Asano et al.

(10) Patent No.: US 7,136,508 B2
(45) Date of Patent: Nov. 14, 2006

(54) IMAGE PROCESSING APPARATUS, METHOD, AND PROGRAM FOR PROCESSING A MOVING IMAGE

(75) Inventors: Motohiro Asano, Osaka (JP); Yumiko Tozuka, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 797 days.

(21) Appl. No.: 09/984,991

(22) Filed: Nov. 1, 2001

(65) Prior Publication Data
US 2002/0085740 A1    Jul. 4, 2002

(30) Foreign Application Priority Data
Nov. 9, 2000   (JP)   ........................... P2000-342190
Mar. 29, 2001  (JP)   ........................... P2001-096314

(51) Int. Cl.
*G06K 9/00* (2006.01)
(52) U.S. Cl. .................. 382/107; 382/181; 382/218; 382/219; 382/220; 382/254; 382/274; 348/135; 348/700
(58) Field of Classification Search ........... 382/107, 382/181, 254, 218, 219, 220, 274; 348/135, 348/700
See application file for complete search history.

(56) References Cited

U.S. PATENT DOCUMENTS

| | | | | |
|---|---|---|---|---|
| 5,576,950 A | * | 11/1996 | Tonomura et al. | 386/121 |
| 5,732,146 A | * | 3/1998 | Yamada et al. | 382/107 |
| 5,832,121 A | * | 11/1998 | Ando | 382/236 |
| 5,875,003 A | * | 2/1999 | Kato et al. | 348/699 |
| 5,974,219 A | * | 10/1999 | Fujita et al. | 386/52 |
| 6,081,551 A | * | 6/2000 | Etoh | 375/240 |
| 6,628,713 B1 | * | 9/2003 | Kojima et al. | 375/240.16 |

FOREIGN PATENT DOCUMENTS

JP           07-038842        *   2/1995

* cited by examiner

Primary Examiner—Jingge Wu
Assistant Examiner—Shefali Patel
(74) Attorney, Agent, or Firm—Buchanan Ingersoll & Rooney PC

(57) ABSTRACT

A moving image Vd consists of a plurality of frames $F_1$–$F_{12}$. A scene change SC of the moving image Vd is detected according to change in each frame regarding to brightness information of image, and the plurality of frames are divided into frame groups FG1 ($F_1$–$F_8$) and FG2 ($F_9$–$F_{12}$) each having substantially the same scene at the scene change as a boundary. Then, with respect to the frame group FG1, every three frames, $F_1$, $F_4$, $F_7$ are sampled to execute scene determination, and a most frequent scene is determined as a common scene of the frame group. Consequently, scene determination results for sufficiently scene-changed frames $F_4$, $F_7$ interposed between frames $F_1$, $F_{12}$ of both ends of the frame group FG1 can be utilized, so that it is possible to determine the common scene with high accuracy.

9 Claims, 23 Drawing Sheets

F I G . 1 3
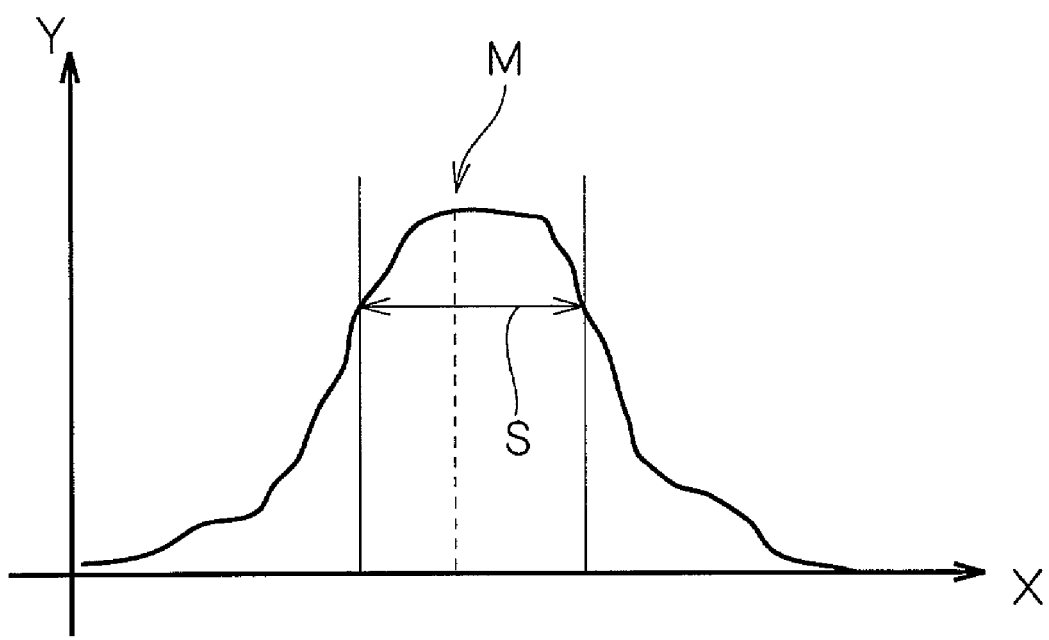

RESULT OF SCENE DETERMINATION OF
MOVING IMAGE (BEFORE CORRECTION)

| FRAME GROUP NUMBER | FRAME NUMBER | RESULT OF MAIN DETERMINATION |
|---|---|---|
| 1 | 1~8 | NORMAL |
| 2 | 9 | HIGH CONTRAST |
| 3 | 10~15 | NORMAL |
| 4 | 16~30 | YELLOW FOG |

RESULT OF SCENE DETERMINATION OF
MOVING IMAGE (AFTER CORRECTION)

| FRAME GROUP NUMBER | FRAME NUMBER | RESULT OF MAIN DETERMINATION |
|---|---|---|
| 1 | 1~15 | NORMAL |
| 2 | 16~30 | YELLOW FOG |

IMAGE PROCESSING APPARATUS, METHOD, AND PROGRAM FOR PROCESSING A MOVING IMAGE

This application is based on applications Nos. 2000-342190 and 2001-096314 filed in Japan, the contents of which are hereby incorporated by reference.

BACKGROUND OF THE INVENTION

1. Field of the Invention

The present invention relates to a moving image processing technique and, in particular, to improvement in a scene determination technique in moving images.

2. Description of the Background Art

In a conventional moving processing, there is known a method in which a scene change in a moving image is determined by detecting a change in brightness or the like for every frame constituting the moving image, and a common scene characteristic which is a common moving image characteristic among a frame group having substantially the same scene from that scene change to the next scene change is determined.

Then, on the basis of a correction parameter corresponding to the common scene characteristic, image correction is executed for the frame group by one operation, thereby making the moving processing more efficient and appropriate.

In the above moving image processing, the common scene characteristic is determined on the basis of only the scene determination with respect to a frame directly after a scene change, however, the frame directly after a scene change is not always sufficiently scene changed, so that the determination accuracy of common scene characteristic is often poor.

On the other hand, in a conventional moving image correction, first a change in brightness or the like is detected for every frame image (hereinafter, simply referred to as "frame") constituting the moving image as a preliminary processing, whereby a scene change in the moving image is detected. Then, a frame group from that scene change to the next scene change is regarded as a frame group representing substantially the same scene, and a common scene characteristic as a scene characteristic which is common among the frame group is determined. To be more specific, a characteristic of a scene represented by a frame directly after a scene change is determined, and the result of determination is defined as a common scene characteristic.

After that, a correction parameter corresponding to the common scene characteristic is determined, and on the basis of the correction parameter, the same image correction is executed on the frame group. In this way, moving image correction is made more efficient and appropriate.

By the way, in determination of a scene characteristic represented by a frame (hereinafter, referred to as "scene determination"), there is a case that it is preferred to determine as indiscriminable because reliability of the determination result is poor. In such a case, it becomes impossible to determine a common scene characteristic and a correction parameter, so that it becomes necessary to take such measures of, for example, executing correction of a frame group that is indiscriminable by using a correction parameter used for correction of a preceding frame group.

Also, scene determination with respect to a frame is almost the same as a scene determination executed in correction of a static image, and measures in the case of indiscriminable should be taken not only for moving images but also for static images.

SUMMARY OF THE INVENTION

The present invention is directed to an image processing apparatus.

According to the present invention, the apparatus is an image processing apparatus for processing a moving image consisting of a plurality of frames, the image processing apparatus comprising: (a) a setting element for detecting a scene change with regard to the moving image in accordance with change of each frame related to predetermined image information and setting frame sections with the scene change being a boundary therebetween; (b) a scene determining element for determining a scene characteristic for at least one frame interposed between frames on both ends of a frame section; and (c) a deciding element for deciding a common scene characteristic representing a common characteristic in the frame section on the basis of a result of scene determination by the scene determining element. Therefore, since a common scene characteristic representing a common characteristic in a frame section is determined on the basis of a determination result of scene characteristic of at least one frame interposed between the frames on both sides of the frame section, the common scene can be determined with high accuracy.

In a preferred embodiment of the present invention, the image processing apparatus is characterized in that the scene determining element determines a scene characteristic for frames other than frames in a vicinity of the scene change. Therefore, since frames exclusive of the frames in the vicinity of a scene change are subjected to the determination of scene characteristic, the common scene can be determined with higher accuracy.

Also, according to the present invention, the image processing apparatus comprises: (a) an element for determining characteristics of a plurality of frame images in a moving image including a result of indiscriminable and acquiring a plurality of determination results; and (b) deciding a scene characteristic represented by the moving image on the basis of the plurality of determination results. Therefore, it is possible to determine the scene characteristic represented by the moving image appropriately while taking indiscriminable results into consideration.

Also, the present invention is directed to an image processing method, an image determining method, a recording medium and a program.

Therefore, the object of the present invention is to provide an image processing technique capable of determining a common scene characteristic with high accuracy in moving images.

Another object of the present invention is to provide an image processing technique capable of improving the accuracy in determining scene characteristics of image.

These and other objects, features, aspects and advantages of the present invention will become more apparent from the following detailed description of the present invention when taken in conjugation with the accompanying drawings.

BRIEF DESCRIPTION OF THE DRAWINGS

FIG. 13 is a view showing a histogram created based on green pixels in a frame;

DESCRIPTION OF THE PREFERRED EMBODIMENTS

First Embodiment

Essential Structure of Image Processing Apparatus

Figure 1:
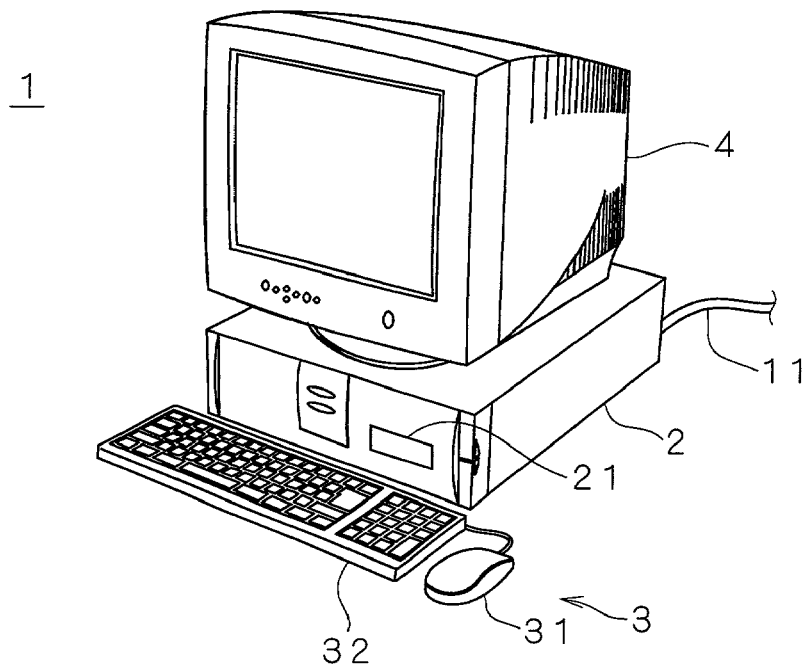
FIG. 1 is a perspective view showing an essential structure of an image processing apparatus according to the first embodiment of the present invention.

FIG. 1 is a perspective view showing an essential structure of an image processing apparatus 1 according to the first embodiment of the present invention.

The image processing apparatus 1 is configured by a personal computer and having a processing unit 2 of a box shape, an operational unit 3 and a monitor 4.

The processing unit 2 is a unit that executes moving image processing, and has in its front surface a inserting portion 21 through which a recording medium 9 such as an optical disc is to be inserted.

The operational unit 3 consists of a mouse 31 and a keyboard 32, and accepts an input operation with respect to the image processing apparatus 1 made by a user.

On the monitor 4, information based on an instruction from the processing unit 2 is to be displayed.

Figure 2:
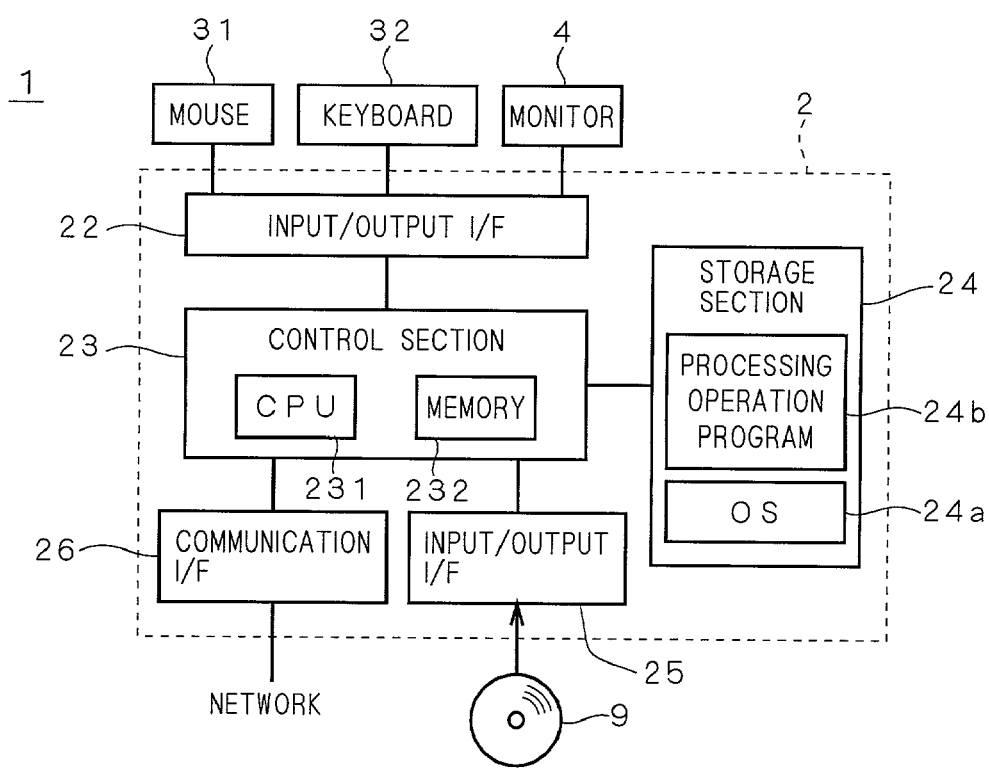
FIG. 2 is a view showing functional blocks of the image processing apparatus.

FIG. 2 is a view showing functional blocks of the image processing apparatus 1.

The processing unit 2 of the image processing apparatus 1 has an input/output I/F 22 connected with the mouse 31, the keyboard 32 and the monitor 4 and a control section 23 electrically connected with the input/output I/F 22. The processing unit 2 also has a storage section 24, an input/output I/F 25 and a communication I/F 26 electrically connected with the control section 23.

The input/output I/F 22 is an interface for controlling data transmission between the mouse 31, the keyboard 32 and the monitor 4, and the control section 23.

The storage section 24 is configured by a hard disc, in which an operation system (OS) 24a and an operation processing program 24b for executing moving image processing are stored.

The input/output I/F 25 is an interface for performing input/output of data with respect to the recording medium 9 via the inserting portion 21.

The communication I/F 26 is a n interface for communication with an external network of the image processing apparatus 1 via a communication line 1.

The control section 23 having a CPU 231 and a memory 232 organically controls each section described above, thereby exercising centralized control over operations of the image processing apparatus 1. The memory 232 is also allowed to store the program data recorded on the recording medium 9 via the input/output I/F 25. That is, the program 24b for image processing may be directly read into the memory 232 from the recording medium 9 or may read into the memory 232 after being stored in the storage section 24 from the recording medium 9. Then, the program is executed by the CPU 231, whereby operation of an image processing apparatus is executed by the computer.

Operation of Image Processing Apparatus 1

Figure 3:
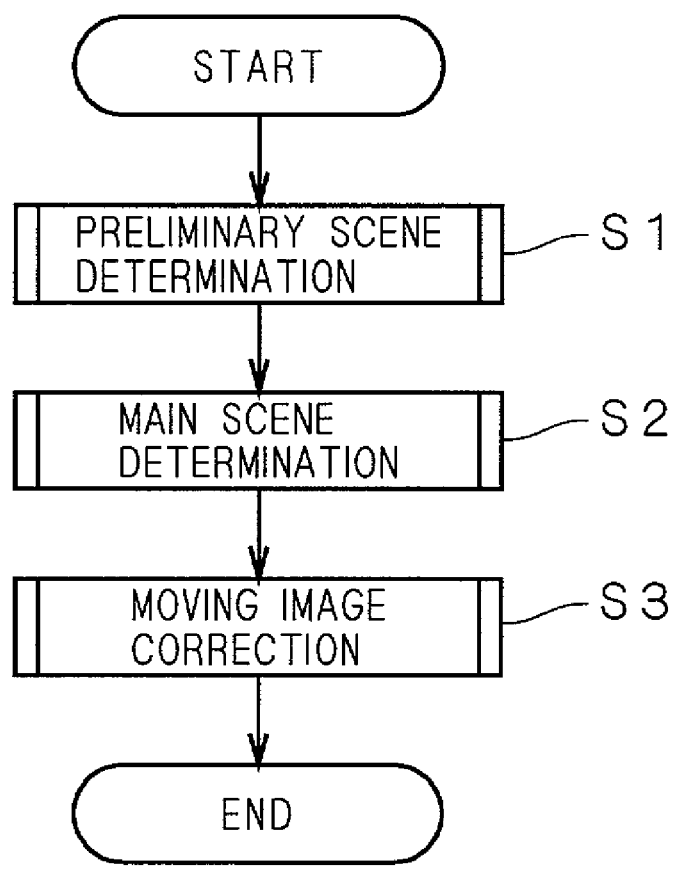
FIG. 3 is a flow chart showing a basic operation of the image processing apparatus.

FIG. 3 is a flow chart showing a basic operation of the image processing apparatus 1. This operation is automatically executed by the CPU 231 of the control section 23.

At step S1, preliminary scene determination of moving image as will be later described is executed.

At step S2, main scene determination of moving image as will be later described is executed.

At step S3, correction of moving image as will be later described is executed.

Figure 4:
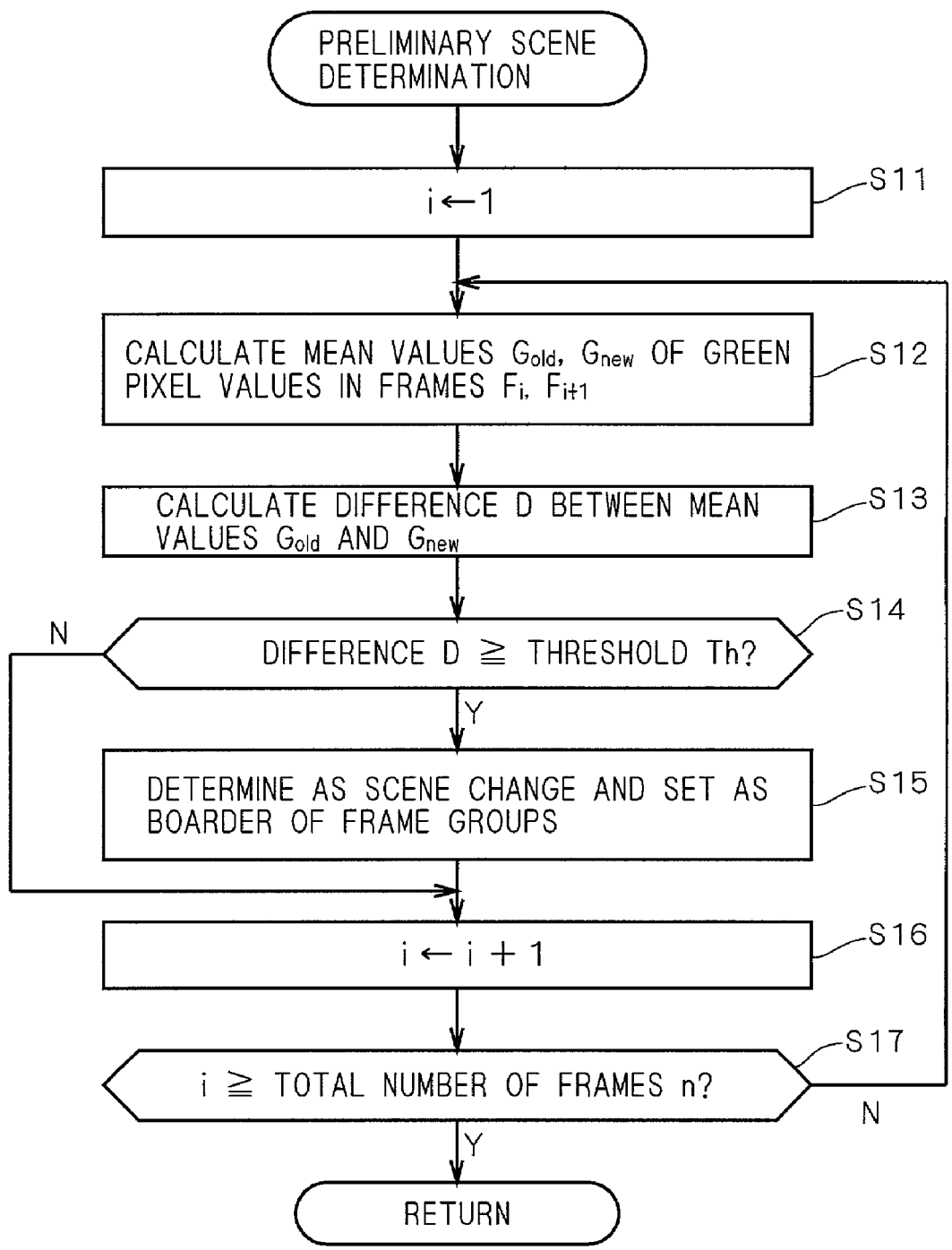
FIG. 4 is a flow chart showing an operation of preliminary scene determination of moving image.
Figure 5:
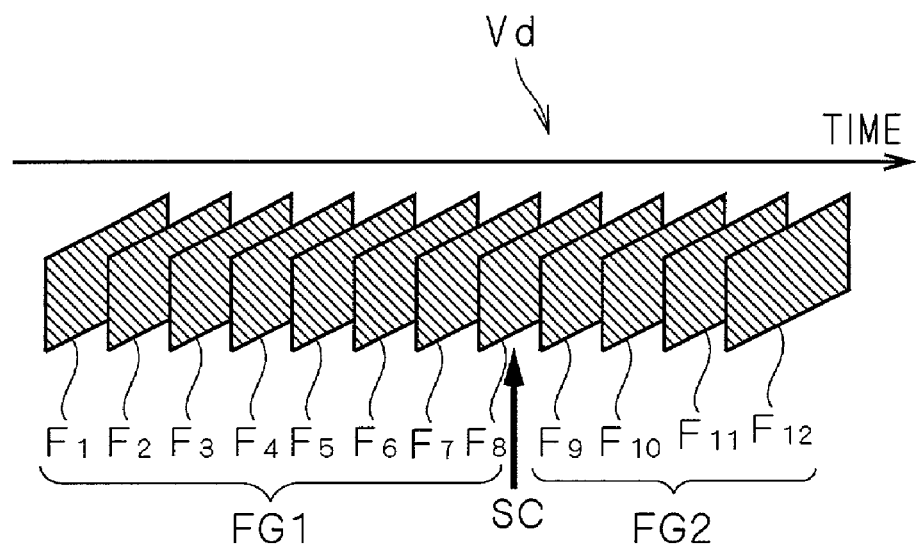
FIG. 5 is a view for explaining the preliminary scene determination.

FIG. 4 is a flow chart for showing an operation of the preliminary scene determination of moving image, and FIG. 5 is a view for explaining the preliminary scene determination.

A moving image Vd consists of 12 frames $F_1$–$F_{12}$ where a color image is formed by combining color components of R(red), G(green) and B(blue), as shown, for example, in FIG. 5. In the following, explanation is made on preliminary scene determination in this moving image Vd.

At step S11, a counter i is substituted by 1.

At step S12, a mean value $G_{old}$ of green pixel values in frame Fi, and a mean value $G_{new}$ of green pixel values in frame Fi+1 are calculated. In this description, green pixel values are sampled every given number of pixels such as every five pixels (diagonally shaded areas) in a pixel arrangement MD shown in FIG. 6, and a mean value of them is determined.

At step S13, a difference D between the mean value Gold and the mean value Gnew is calculated.

At step S14, whether or not the difference D is more than or equal to a threshold Th is determined. When it is determined that the difference D is more than or equal to the threshold Th, the flow proceeds to step S15, whereas when it is determined that the difference D is less than the threshold Th, the flow proceeds to step S16.

At step S15, it is determined that a scene change occurs in frame Fi and the frame number thereof is recorded and set as a boundary of frame groups (frame section). In the case of the moving image Vd shown in FIG. 5, it is determined that a scene change occurs in frame $F_8$, and frames $F_1$–$F_8$ are classified as a frame group FG1, and frames $F_9$–$F_{12}$ are classified as a frame group FG2.

Figures 7, 8:
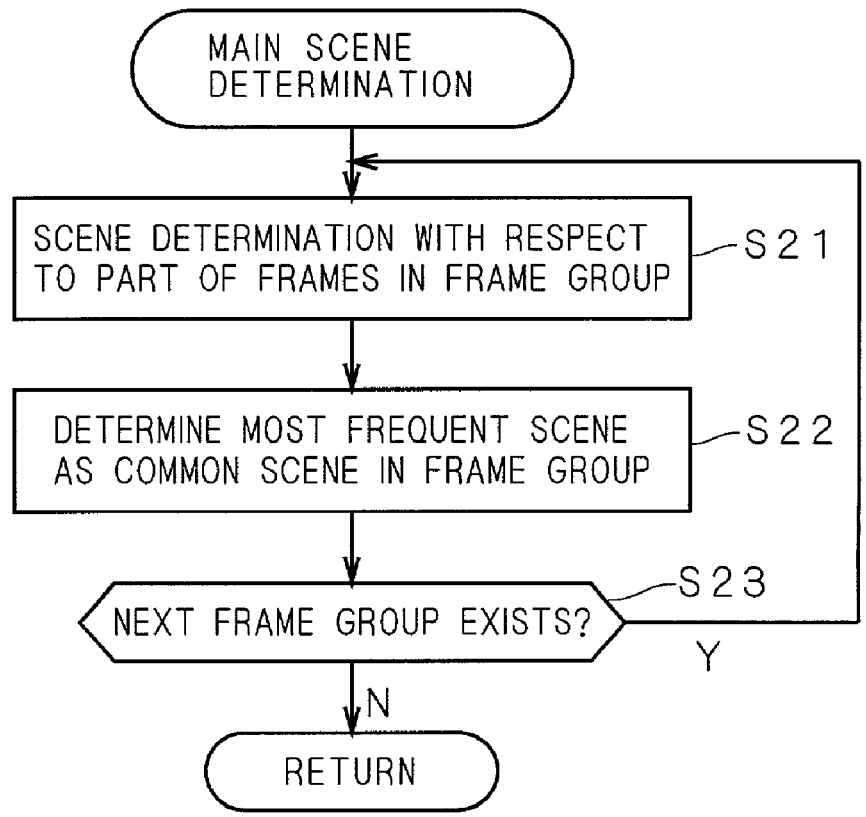
FIG. 7 is a view showing an RGB Bayer arrangement in a CCD.
FIG. 8 is a flow chart showing an operation of main scene determination of moving image.

In the above, determination of scene change is made by extracting pixel values of the green color component among the RGB color components which is image information. This is because a green pixel value has a characteristic which is similar to the brightness of the entire image, so that accuracy comparable to that obtained by the conventional method which considers all color components can be achieved. Furthermore, many CCDs used in digital videos or digital cameras have an RGB Bayer arrangement as shown in FIG. 7, and green pixels (diagonally shaded areas) have twice sensitivity (region) as high as those of the other colors R, B, so that it is possible to make determination with high accuracy.

In this way, by detecting a scene change while using only green pixels, rapid processing can be realized.

At step S16, the counter i is substituted by i+1.

At step S17, whether or not the counter i is more than or equal to a total number n of frames constituting the moving image Vd, or in other words, whether or not determination of scene change for all of the frames in the moving image to be processed has completed is determined. In the moving image Vd shown in FIG. 5, n is 12. In this context, in the case where the counter i is more than or equal to n, the flow proceeds to step S2, whereas, when the counter i is less than n, the flow returns to step S12.

As a consequence of the above operation, all of frames $F_1$–$F_{12}$ diagonally shaded in FIG. 5 are subjected to determination of scene change, and divided into a plurality of frame groups each of which containing frames which are highly correlated, or which are regarded as being in substantially the same scene.

Furthermore, since determination of scene change is made for each frame while taking green pixel values or information of only a part of plurality of color components into account according to the above-described operation of preliminary scene determination, it is possible to improve the detection speed of scene change, that is, it is possible to rapidly execute moving image processing.

Figure 9:
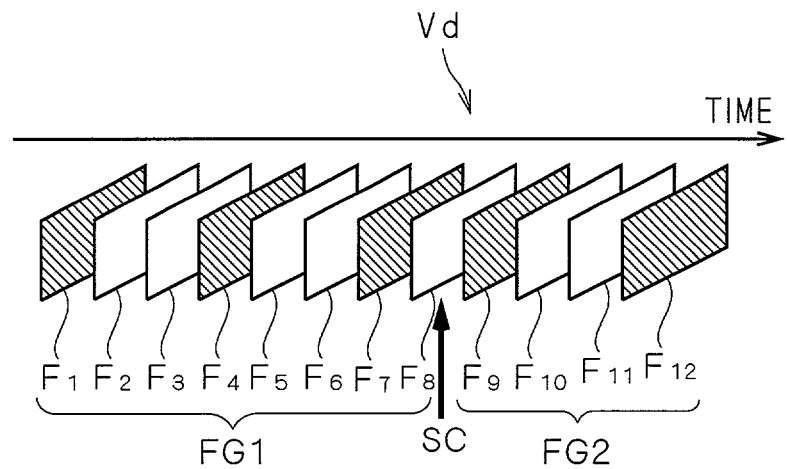
FIG. 9 is a view for explaining the main scene determination.

FIG. 8 is a flow chart showing operation of main scene determination of moving image. FIG. 9 is a view for explaining the main scene determination.

At step S21, scene determination is made for part of frames in the frame group FG1. The scene determination in this context includes determining scenes as characteristics of the image such as sunset determination, color fog determination, contrast determination, as disclosed in Japanese Unexamined Patent Publication JP-A 11-298736 (1999). At this step S21, discrete frame sampling is made for the frame group FG1 at equivalent time intervals, for example, every 1 second. To be more specific, as shown by the parallel diagonal lines in FIG. 9, frames $F_1$, $F_4$, $F_7$ are sampled every 3 frames, and scene determination is made for these frames.

Also, a predetermined number of frames, for example, 3 frames may be sampled for each frame group. In such a case, it is preferred that the time intervals of these 3 frames are equivalent.

At step S22, a characteristic of image content of a most frequent scene in the frame group FG1 is determined as a common scene characteristic which is common in the frame group.

At step S23, whether or not a next frame group exists, that is, whether the scene determination of frame groups in the moving image VD has completed is determined. Then, if a next frame group exists, the flow returns to step S21, and executes the operations of step S21, S22. For example, in the case of the moving image Vd, the operation shifts to scene determination for the next frame group FG2 upon completion of the scene determination for the frame group FG1. On the other hand, if a next frame group does not exist, the flow proceeds to step S3.

The operation of the above-described main scene determination will be concretely explained with the use of Tables 1 and 2.

TABLE 1

| Frame number | Result of main scene determination |
|---|---|
| 1 | green fog |
| 4 | green fog |
| 7 | normal |

TABLE 2

| Frame group number | Frame number | Result of main scene determination |
|---|---|---|
| 1 | 1–8 | green fog |
| 2 | 9–12 | low contrast |

In the case where frames $F_1$, $F_4$ and $F_7$ in the frame group FG1 are determined as "green fog", "green fog" and "normal", respectively as shown in Table 1 as the result of the above operation of step S21, "green fog" which is the most frequent scene is determined as a common scene of the frame group FG1 in the operation of step S22.

Also for the frame group FG2, scene determination of the moving image Vd is made as shown in Table 2 by executing main scene determination in a similar manner as the frame group FG1.

As a consequence of the above-described operation of main scene determination, scene determination is made for the frames $F_4$, $F_7$ interposed between the end frames $F_1$ and $F_{12}$ in the frame group FG1, so that it is possible to determine the common scene with high accuracy.

Figure 10:
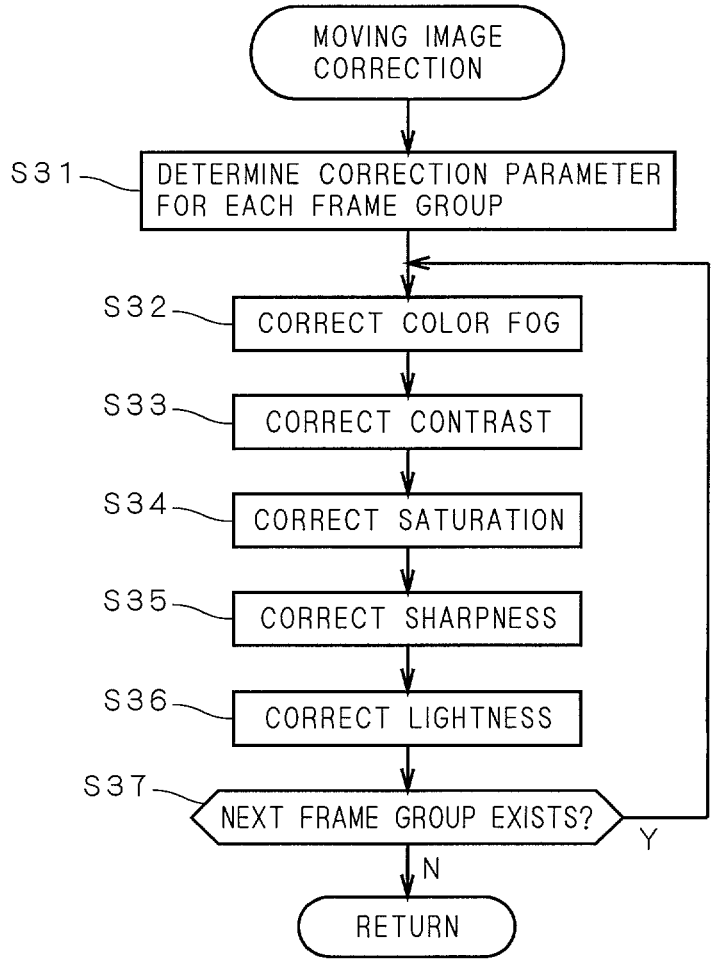
FIG. 10 is a flow chart showing an operation of correction of moving image.

FIG. 10 is a flow chart showing operation of moving image correction.

At step S31, a correction parameter (correction level) is determined for each frame group. In this context, for example, as shown in Table 3 below, correction levels for appropriately displaying the image are set for the scenes "normal", "low contrast", "high contrast", "green fog" and "green fog and low contrast", respectively, and according to the common scene characteristic determined by the operation of main scene determination as described above, the correction level is determined as shown in Table 4 below.

TABLE 3

| Scene | Correction item | Correction level |
|---|---|---|
| normal | correction of color fog | 0 |
|  | correction of contrast | 5 |
|  | correction of saturation | 5 |
|  | correction of sharpness | 5 |
|  | correction of lightness | 5 |
| low contrast | correction of color fog | 0 |
|  | correction of contrast | 2 |
|  | correction of saturation | 4 |
|  | correction of sharpness | 4 |
|  | correction of lightness | 5 |
| high contrast | correction of color fog | 0 |
|  | correction of contrast | 8 |
|  | correction of saturation | 6 |
|  | correction of sharpness | 5 |
|  | correction of lightness | 5 |
| green fog | correction of color fog | 5 |
|  | correction of contrast | 5 |
|  | correction of saturation | 5 |
|  | correction of sharpness | 5 |
|  | correction of lightness | 5 |
| green fog & low contrast | correction of color fog | 5 |
|  | correction of contrast | 2 |
|  | correction of saturation | 4 |
|  | correction of sharpness | 4 |
|  | correction of lightness | 5 |

TABLE 4

| Frame group No. | Frame No. | Result of main determination | Correction item | Correction level |
|---|---|---|---|---|
| 1 | 1–8 | green fog | correction of color fog | 5 |
|  |  |  | correction of contrast | 5 |
|  |  |  | correction of saturation | 5 |
|  |  |  | correction of sharpness | 5 |
|  |  |  | correction of lightness | 5 |
| 2 | 9–12 | low contrast | correction of color fog | 0 |
|  |  |  | correction of contrast | 2 |
|  |  |  | correction of saturation | 4 |
|  |  |  | correction of sharpness | 4 |
|  |  |  | correction of lightness | 5 |

At steps S32–S36, correction of color fog, correction of contrast, correction of saturation, correction of sharpness and correction of lightness are performed on the basis of the correction levels determined at step S31. In this way, it is possible to conduct a collective and appropriate image correction based on the common scene characteristic for the frame group.

At step S37, whether or not a next frame group exists, or whether image correction for all the frame groups in the moving image has completed is determined. Then, if a next frame group exists, the flow returns to step S32.

Furthermore, as for the above-described operation of moving image correction, in place of setting the correction levels of all the frames in each frame group uniformly as shown in Table 4, correction levels of frames in the vicinity of a scene change may be set at the levels belonging to neighboring frame groups. To be specific, as shown in Table 5, a correction level is adjusted by linear interpolation while taking correction levels of neighboring frame groups into consideration for the correction levels of frames $F_7$–$F_{10}$.

TABLE 5

| Frame group No. | Frame No. | Result of main determination | Correction item | Correction level |
|---|---|---|---|---|
| 1 | 1–6 | green fog | correction of color fog | 5 |
|  |  |  | correction of contrast | 5 |
|  |  |  | correction of saturation | 5 |
|  |  |  | correction of sharpness | 5 |
|  |  |  | correction of lightness | 5 |
|  | 7 | green fog | correction of color fog | 4 |
|  |  |  | correction of contrast | 4.4 |
|  |  |  | correction of saturation | 4.8 |
|  |  |  | correction of sharpness | 4.8 |
|  |  |  | correction of lightness | 5 |
|  | 8 | green fog | correction of color fog | 3 |
|  |  |  | correction of contrast | 3.8 |
|  |  |  | correction of saturation | 4.6 |
|  |  |  | correction of sharpness | 4.6 |
|  |  |  | correction of lightness | 5 |
| 2 | 9 | low contrast | correction of color fog | 2 |
|  |  |  | correction of contrast | 3.2 |
|  |  |  | correction of saturation | 4.4 |
|  |  |  | correction of sharpness | 4.4 |
|  |  |  | correction of lightness | 5 |
|  | 10 | low contrast | correction of color fog | 1 |
|  |  |  | correction of contrast | 2.6 |
|  |  |  | correction of saturation | 4.2 |
|  |  |  | correction of sharpness | 4.2 |
|  |  |  | correction of lightness | 5 |
|  | 11–12 | low contrast | correction of color fog | 0 |
|  |  |  | correction of contrast | 2 |
|  |  |  | correction of saturation | 4 |
|  |  |  | correction of sharpness | 4 |
|  |  |  | correction of lightness | 5 |

As a result of this, it is possible to prevent the correction levels from becoming discontinuous at a boundary of frame groups, so that it is possible to conduct image correction smoothly for the entire moving image. Furthermore, even if some scene changes are detected erroneously, the adverse effect caused by that can be reduced.

Second Embodiment

The structure of an image processing apparatus 1 according to the second embodiment of the present invention resembles the structure of the image processing apparatus 1 as described above instead that the program for executing operation relating to the image processing apparatus 1 as will be described later is stored in the memory 232 of the general control section 23 shown in FIG. 2.

Figure 11:
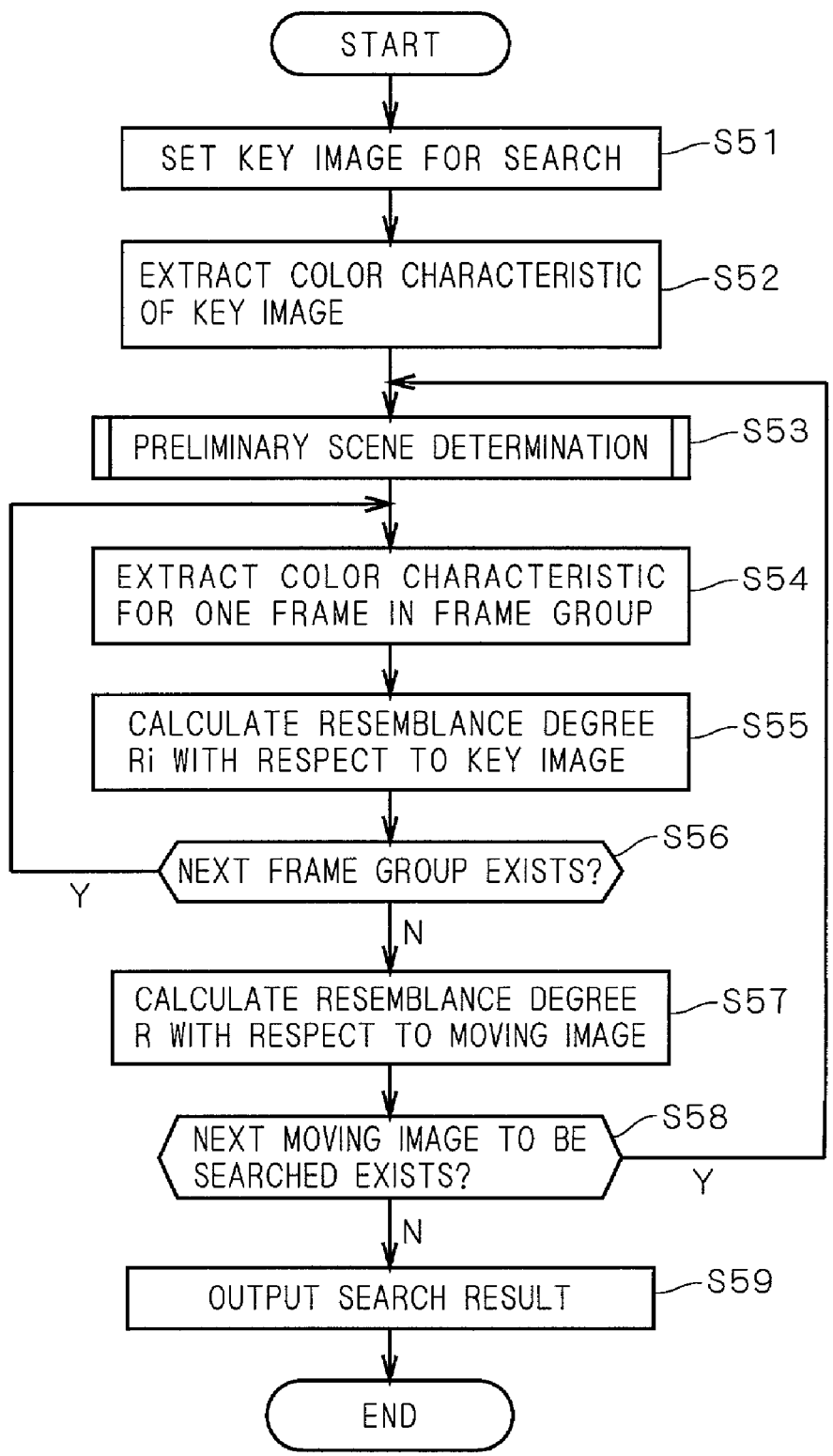
FIG. 11 is a flow chart showing a basic operation of an image processing apparatus according to the second embodiment of the present invention.

FIG. 11 is a flow chart showing a basic operation of the image processing apparatus 1. This operation is automatically executed by the CPU 231 of the control section.

In this operation, a search operation for a plurality of moving images is executed in place of moving image correction operation in the image processing apparatus 1 according to the first embodiment.

At step S51, a key image for search is set in the moving image by user's operation with respect to the operational unit 3. In addition, threshold Td for determining resemblance degree R of color feature as will be described below is set at, for example, 0.6.

At step S52, a color feature of the key image is extracted. Incidentally, if the user has designated a color feature, that information is directly used.

A color feature extracted by the method disclosed in Japanese Unexamined Patent Publication JP-A 11-96364 (1999). Brief explanation of the above color feature will be made below.

Color feature is obtained in the manner as follows: an RGB value of each pixel in a frame is converted into an HSL value; the color of each pixel constituting the image is counted for each color group while referring to a color group classification table which contains classification information for classifying colors into a plurality of color groups based on values of a plurality of color elements which signify colors; then an average color of each color group is determined on the basis of the values of the color elements of pixel counted in the color group; a share which is the proportion of the counted pixels in the color group with respect to the entire image is calculated for each color group; and the average color and the share of the color group is extracted for each color group.

At step S53, preliminary scene determination as will be described later is performed.

At step S54, a color feature is extracted for one frame in a frame group. At this time, in the case where color features from a plurality of frames are extracted as is the case of the operation of main scene determination in the first embodiment, it is preferred to determine an average of the extracted color features.

At step S55, resemblance degree R1 of the frame group with respect to the key image is calculated.

At step S56, whether or not a next frame group exists, that is whether extraction of color feature for all the frame groups in the moving image has completed is determined. Then, if a next frame group exists, the flow returns to step S54, while on the other hand, if a next frame group does not exist, the flow proceeds to step S57.

At step S57, resemblance degree R with respect to the moving image is calculated. In this case, provided that $ki (i=1, 2, \ldots)$ is proportion of frame numbers of each frame group with respect to all the frames constituting the moving image and $Ri (i=1, 2, \ldots)$ is resemblance degree in each frame group, the resemblance degree R can be calculated by weighed sum in the form of $R = k1 \times R1 + k2 \times R2 + \ldots$.

At step 58, whether or not a next moving image to be searched exists is determined. At this step, if a next moving image exists, the flow returns to step S553, while on the other hand, if a next moving image does not exist, the flow proceeds to step S59.

At step S59, a moving image of which resemblance degree with respect to the key image is more than or equal to the threshold Td set at step S51 among the searched plurality of moving images is outputted to the monitor 4 as a search result.

Figure 12:
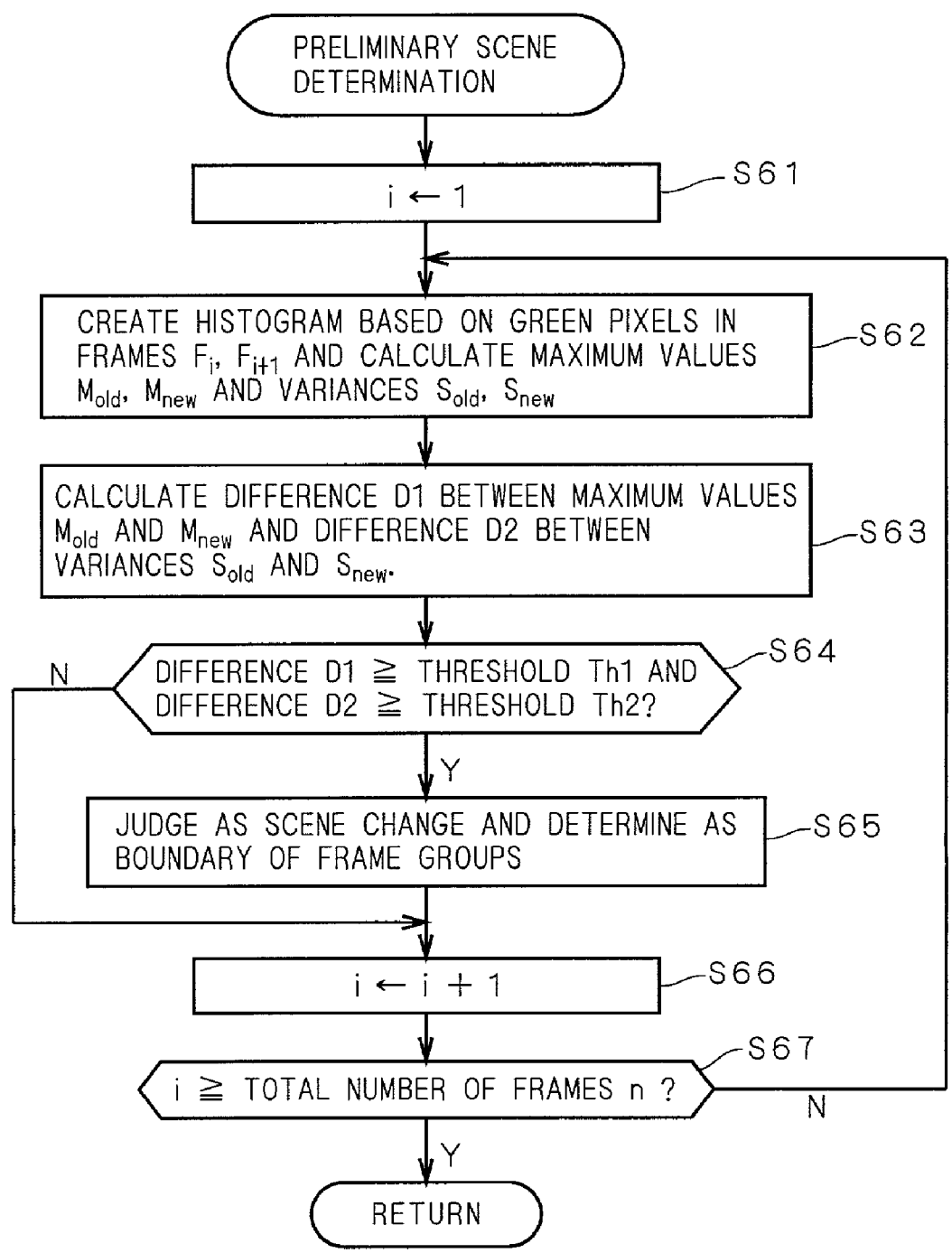
FIG. 12 is a flow chart showing an operation of preliminary scene determination of moving image.

FIG. 12 is a flow chart showing operation of preliminary scene determination of moving image.

At step S61, the counter i is substituted by 1 in the same manner as step S11 of FIG. 4.

At step 62, as shown in FIG. 13, maximum value $M_{old}$ and variance $S_{old}$ of the histogram which is created on the basis of green pixels in frame $F_1$ and maximum value $M_{new}$ and variance $S_{new}$ of the histogram which is created on the basis of green pixels in frame Fi+1 are calculated as shown in FIG. 13. Incidentally, in the histogram shown in FIG. 13, the horizontal axis denotes brightness (pixel value) x and the vertical axis denotes pixel number y. And the above variance S is calculated by the following expression.

$$S = \sum_{i=1}^{n} x i^2 y i \bigg/ \sum_{i=1}^{n} y i - \left( \sum_{i=1}^{n} x i y i \bigg/ \sum_{i=1}^{n} y i \right)^2$$

As a consequence, determination of scene change is made while taking only green pixels into account as is the case of the first embodiment, so that it is possible to execute rapid processing with accuracy.

At step S63, difference D1 between the maximum values $M_{old}$ and $M_{new}$ and difference D2 between the variances $S_{old}$ and $S_{new}$ are calculated.

At step S64, whether or not the difference D1 is more than or equal to the threshold Th1 and the difference D2 is more than or equal to the threshold Th2 is determined. Then, if the differences D1 and D2 are more than or equal to the thresholds Th1 and Th2, respectively, the flow proceeds to step S65, while on the hand, if the differences D1 and D2 are less than the thresholds Th1 and Th2, respectively, the flow proceeds to step S66.

At steps S65–S67, operations similar to those of steps S15–S17 in the flow chart shown in FIG. 4 are performed.

According to the above preliminary scene determination operation of the image processing apparatus 1, in the same manner as the first embodiment, determination of scene change is made by taking only green pixel values, that is, information of only part of color components for each frame into account, so that it is possible to improve the speed of detecting scene change and to achieve rapid moving image processing.

Figure 14:
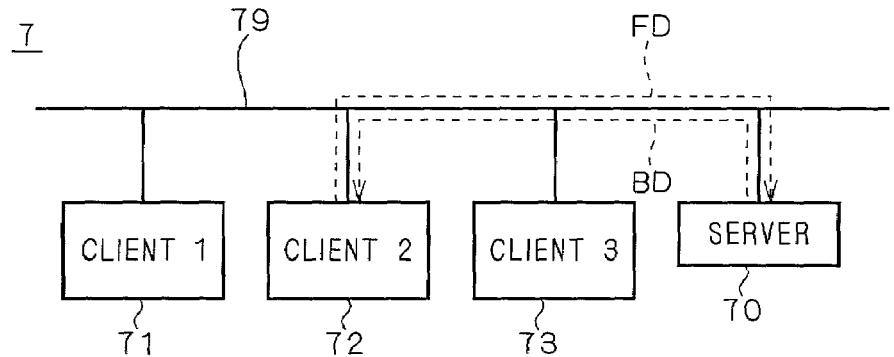
FIG. 14 is a view showing an essential structure of a moving image processing system.

Furthermore, the search of moving image according to the second embodiment is also applicable to a moving image processing system 7 shown in FIG. 14.

The moving image processing system 7 comprises a server 70 having a configuration similar to that of the above image processing apparatus 1, as well as terminals 71–73 which serve as clients capable of communicating with the server 70 via a communication line 79. Also these terminals 71–73 have a configuration similar to that of the image processing apparatus 1.

This moving image processing system 7 enables distant search of moving image by the use of a network.

Figure 15:
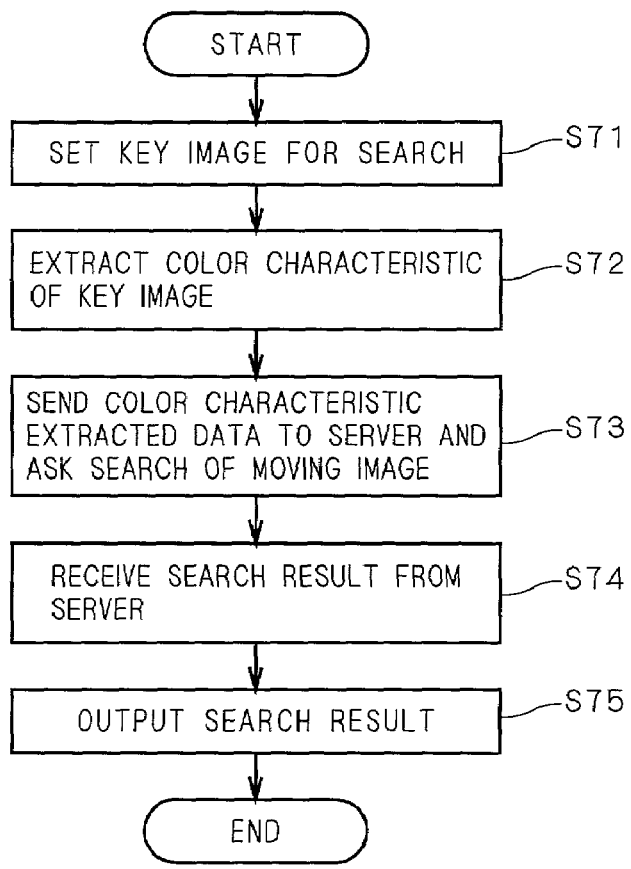
FIG. 15 is a flow chart showing an operation of moving image search in a terminal.

FIG. 15 is a flow chart showing operation of search of moving image in the terminal 72.

At steps S71 and S72, operations similar to those of steps S51 and S52 in the flow chart of FIG. 11 are executed.

At step S73, as shown by the data flow FD in FIG. 14, color feature extracted data extracted at step S72 is transmitted to the server 70 and search for a plurality of moving images stored in the server 70 is asked.

At step S74, as shown by the data flow BD in FIG. 14, a search result of moving image sent from the server 70 at step S88 as will be described later is received.

At step S75, operation similar to that at step S59 in the flow chart of FIG. 11 is executed.

Figure 16:
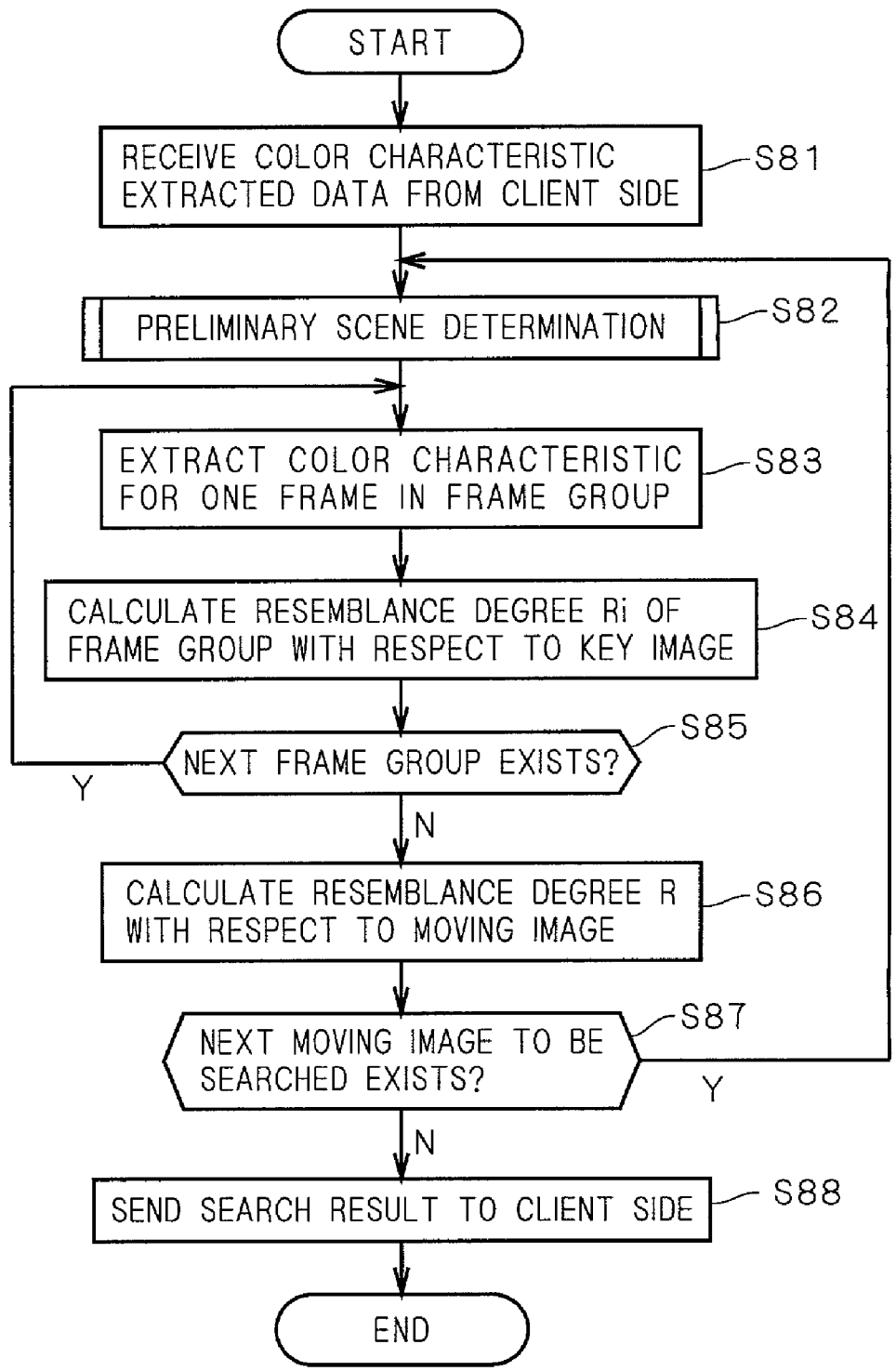
FIG. 16 is a flow chart showing an operation of moving image search in a server.

FIG. 16 is a flow chart showing the operation of search of moving image in the server 70.

At step S81, the color feature extracted data sent from the terminal 72 on the client side at step S73 describe above is received.

At steps S82–S87, operations similar to those of steps S53–S58 in the flow chart of FIG. 11 are executed.

At step S88, a search result is sent to the terminal 72 on the client side by operation similar to that of step S51 in the flow chart of FIG. 11.

According to the above operations of the moving image processing system 7, a similar effect to the above-described image processing apparatus 1 is obtained, as well as search of moving image from a distant terminal with respect to the server storing the moving image information is enabled, so that it becomes more convenient.

Also, it is possible to send a key image to the server from the terminal side, and perform search of moving image on the server side by extracting the color feature.

Moreover, it is possible to use scene information such as green fog as is described above in place of using the extracted color feature in the search of moving image.

Alternatives Related to First and Second Embodiments

As for each embodiment described above, main scene determination may be made for frames other than frames in the vicinity of the scene change SC.

Figure 17:
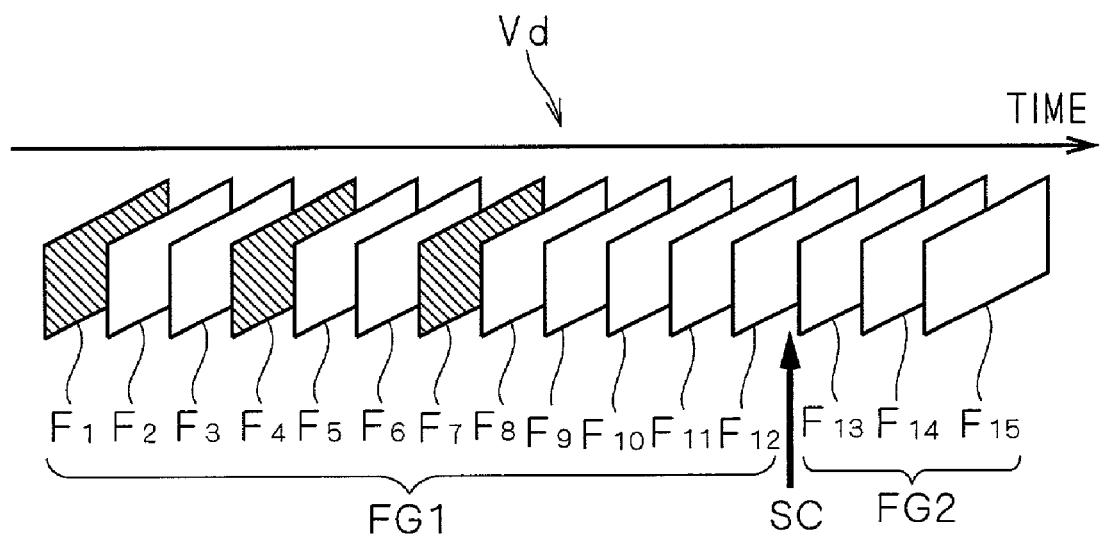
FIG. 17 is a view for explaining an operation of main scene determination according to an alternative.

FIG. 17 is a view for explaining the operation of the present main scene determination.

With respect to the frame group FG1, every 3 frames are sampled, and frames $F_1$, $F_4$, $F_7$ excluding frames $F_{10}$–$F_{12}$ corresponding to one second, for example, in the vicinity of the scene change SG are sampled, whereby the main scene determination is performed.

As a result of this, in a gentle scene change which occurs, for example, at the time of moving from the exterior to the interior, it becomes possible to sufficiently avoid the gentle scene change course. That is, since the frames where scene change is insufficient are not used for the main scene determination, it is possible to perform determination of common scene characteristic with better accuracy.

In each embodiment described above, preliminary scene determination may be executed at constant intervals.

Figure 18:
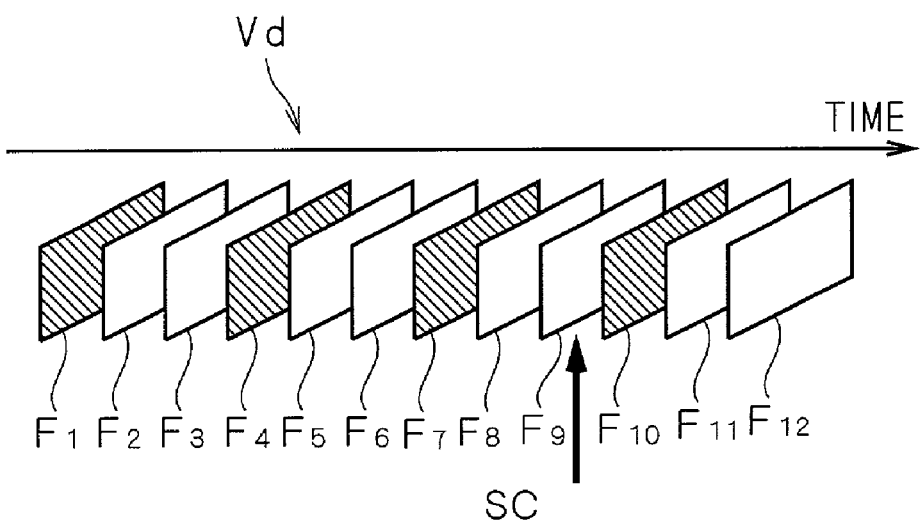
FIG. 18 is a view for explaining an operation of preliminary scene determination according to the alternative.

FIG. 18 is a view for explaining the operation of the present preliminary scene determination.

As for the preliminary scene determination, sampling may be executed at constant intervals, for example, once for three frames. To be more specific, scene changes are detected for frames $F_1$, $F_4$, $F_7$, $F_{10}$ (diagonally shaded) as shown in FIG. 18. In this case, if there is a scene change between frames $F_7$ and $F_{10}$, it is regarded that a scene change occurs in frame $F_9$.

As a consequence, for example, short frame groups that receive disturbance such as flash light and the like are not appropriate to be regarded as scene changes in comparison with detection of scene change with respect to all the frames constituting the moving image are prevented from being detected erroneously. Furthermore, it is possible to perform the operation of preliminary scene determination with high speed.

In this case, there is a possibility that a scene change is detected with being shifted from the frame of actual scene change, however, in the case where the reproduction speed of frame is 15 fps (frame per second), for example, even if the scene change is detected with being shifted by 3 frames, the shift corresponds to only 0.2 seconds, so that there arises no problem and hence special advantage is achieved in such a case.

In each embodiment described above, frames that are regarded as being erroneously determined may be corrected in the main scene determination.

Figures 19A, 19B:
FIGS. 19A and 19B are views for explaining an operation of main scene determination according to the alternative.

FIGS. 19A and 19B are views for explaining the operation of the present main scene determination.

As shown in FIG. 19A, with respect to the moving image that are divided into four frame groups as a result of the preliminary scene determination, a frame group 2 corresponding to a time period which is shorter than a predetermined threshold, or, for example, corresponding to the moving image reproduction time of not more than 0.1 second (in the example shown in FIG. 19A, this frame group 2 consists of only 1 frame) is detected as a short-time frame group, and if the short-time frame group 2 has a common scene characteristic "high contrast" which is different from those of a preceding and a following frame groups 1 and 3, and additionally the preceding and the following frame groups 1 and 3 are of the same scene "normal", the frame group 2 is regarded as being erroneously determined. For this reason, the scene characteristic of this short-time frame group 2 is replaced by the common scene characteristic determined for the preceding and the following frame groups. As a result of this replacement, the moving image is divided into two frame groups as shown in FIG. 19B, so that a proper result of main scene determination is obtained.

As a result of the above, it is possible to prevent erroneous determination due to the influence of, for example, flash light.

Figure 6:
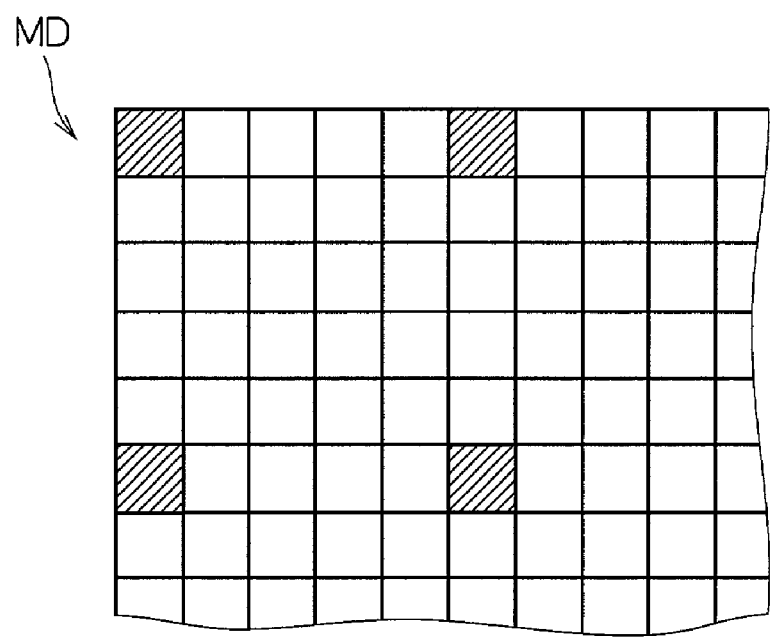
FIG. 6 is a view showing a pixel arrangement.

In the first embodiment, it is not necessary to sample the green pixel values every 5 pixels as shown in FIG. 6, but all the pixels may be sampled, or every two or three pixels may be sampled.

Third Embodiment

Essential Structure of Image Processing Apparatus

An image processing apparatus according to the third embodiment of the present invention has a structure similar to that of the image processing apparatus 1 of the first embodiment shown in FIGS. 1 and 2.

Operation of Image Processing Apparatus

Figure 20:
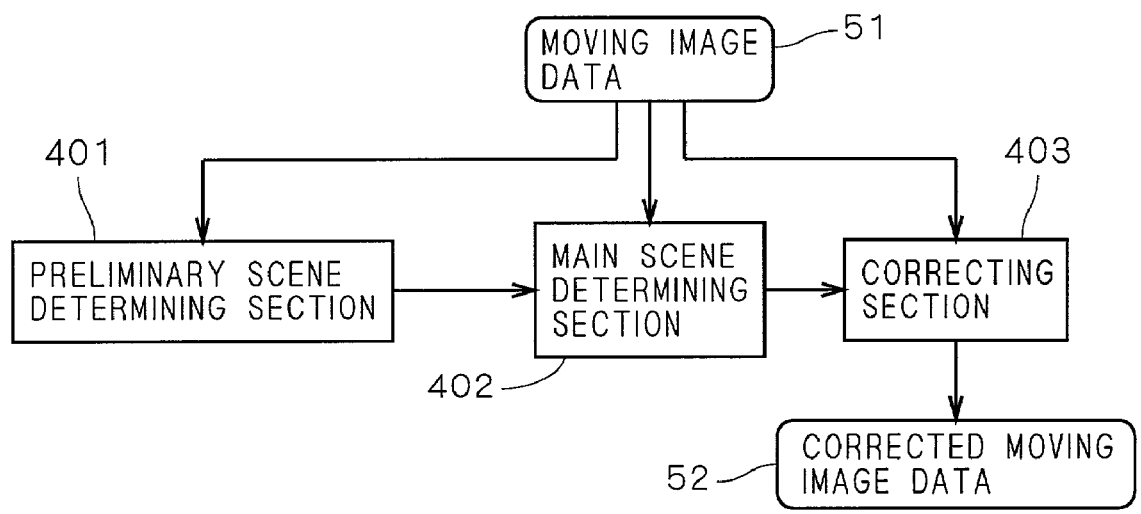
FIG. 20 is a block diagram showing a functional structure of an image processing apparatus according to the third embodiment.
Figure 21:
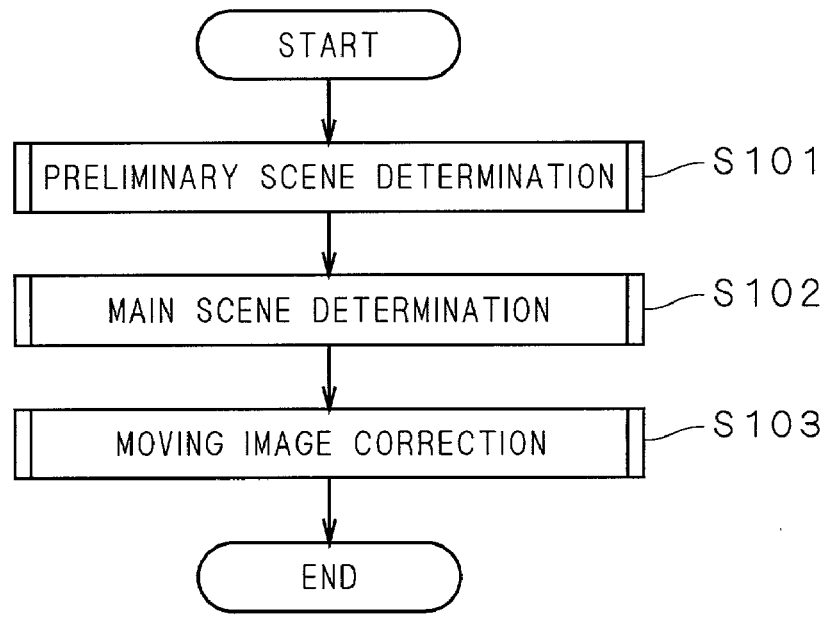
FIG. 21 is a flow chart showing a general operation of the image processing apparatus.

FIG. 20 is a block diagram showing functions implemented by the CPU 231 by executing the program, and FIG. 21 is a flow chart showing a basic operation of the image processing apparatus 1. In FIG. 20, a preliminary scene determining section 401, a main scene determination section 402 and a correcting section 403 show the functions that are implemented by the CPU 231 and the like.

At step S101 shown in FIG. 21, the preliminary scene determining section 401 conducts the preliminary scene determination of moving image on the basis of moving image data 51 to detect scene changes. At step S102, the main scene determining section 402 conducts main scene determination of moving image to determine a common scene characteristic for each frame group ranging from a scene change to the next scene change. At step S103, the correcting section 403 conducts correction of moving image on the basis of the common scene characteristic to generate corrected moving image data 52.

Figure 22:
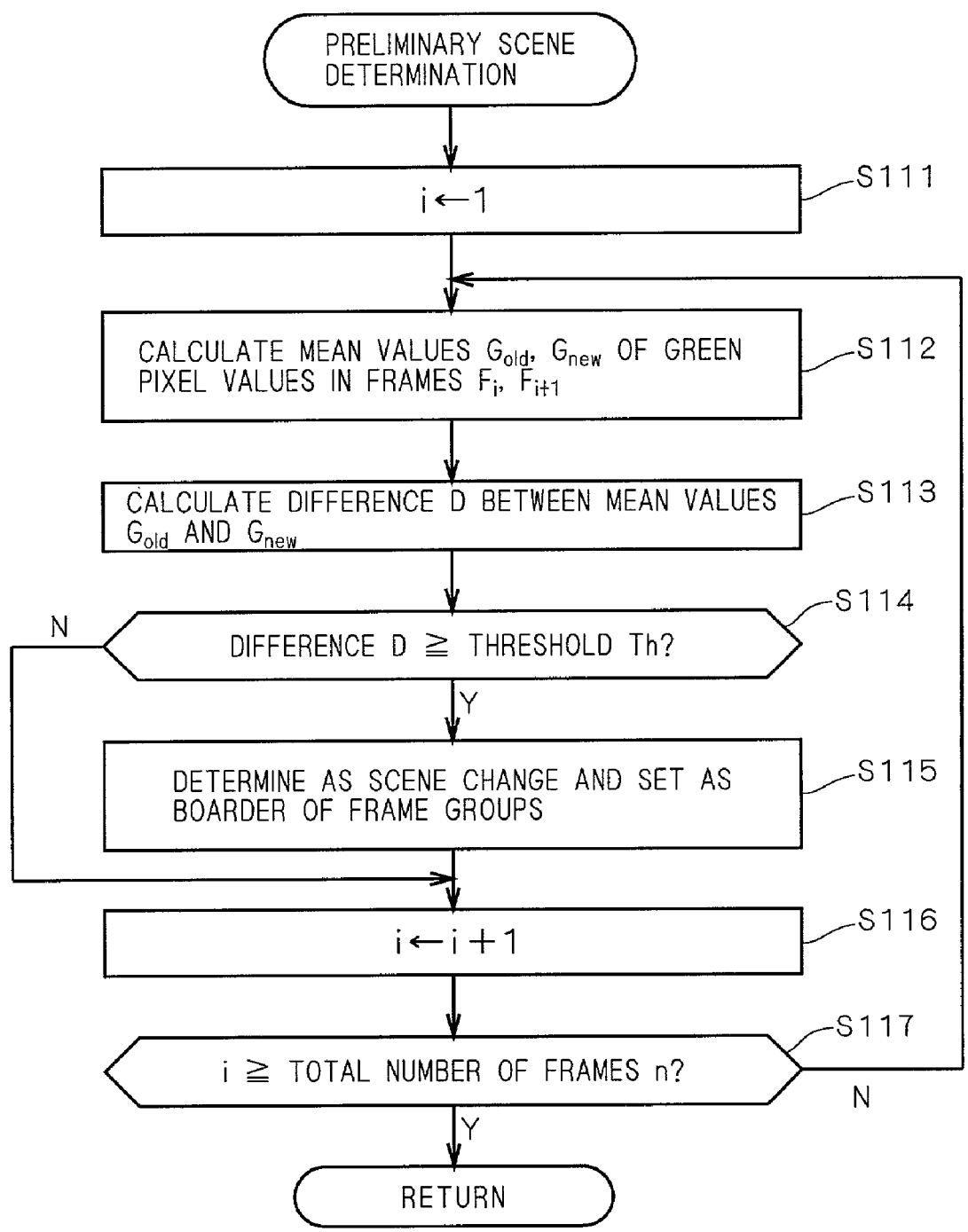
FIG. 22 is a flow chart showing an operation of preliminary scene determination.
Figure 23:
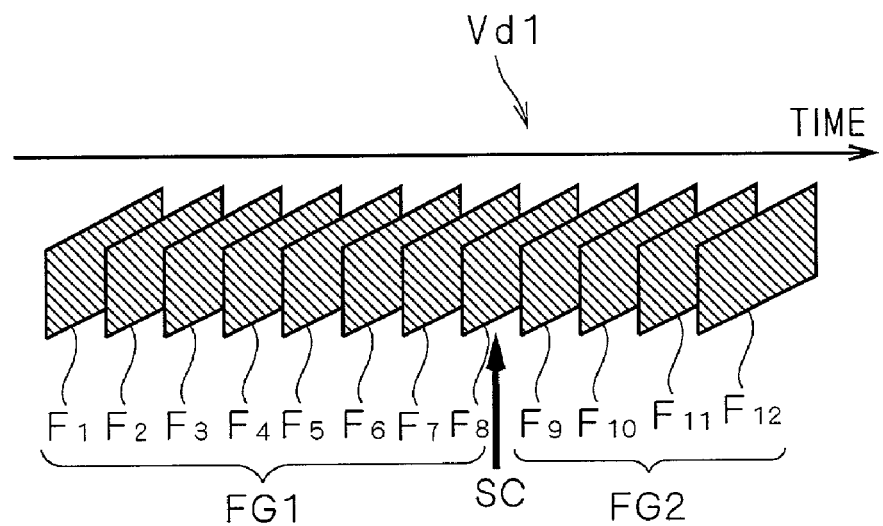
FIG. 23 is a view for explaining the preliminary scene determination.

FIG. 22 is a flow chart showing the operation of preliminary scene determination by the preliminary scene determining section 401, and FIG. 23 is a view for explaining the preliminary scene determination. A moving image Vd1 exemplified in FIG. 23 consists of 12 frames $F_1$–$F_{12}$, each frame being a color image in which color components R(red), G(green), B(blue) are combined. In the following, preliminary scene determination with respect to the moving image Vd1 will be explained with reference to FIGS. 22 and 23.

At step S111, the counter i is substituted by 1, and at step S112, mean value $G_{old}$ of green pixel values in frame Fi and mean value $G_{new}$ of green pixel values in frame Fi+1 are calculated. In this context, in a pixel arrangement Mt shown in FIG. 24, green pixel values of every given number of pixels, e.g., 5 pixels (pixel 71 denoted by parallel diagonal lines) are sampled to determine a mean value.

At step S113, difference D between the mean value $G_{old}$ and the mean value $G_{new}$ are calculated, and at step S114 whether or not the difference D is more than or equal to a threshold Th is checked. Then, if the difference D is more than or equal to the threshold Th, the flow proceeds to step S115, while on the other hand, if the difference D is less than the threshold Th, the flow proceeds to step S116.

In the case where the flow proceeds to step S15, it is determined that a scene change exists between frame Fi and frame Fi+1, and the numbers of these frames are recorded as a boundary of frame groups. FIG. 23 shows such a situation that it is determined that a scene change SCI exists between frame $F_8$ and frame $F_9$, and frames $F_1$–$F_8$ are designated as a frame group FG10 and frames $F_9$–$F_{12}$ are designated as a frame group FG20.

In the above, determination of scene change is made by extracting pixel values of the green color component among the RGB color components which is image information. This is because a green pixel value has a characteristic which is similar to the brightness of the entire image, so that accuracy comparable to that obtained by the conventional method which considers all color components can be achieved.

Furthermore, many CCDs used in digital videos or digital cameras have an RGB Bayer arrangement as shown in FIG. 7, and the number of elements for the color G (diagonally shaded areas) is twice the respective numbers of elements for the other colors R, B. And vales of R, G and B of each pixel are determined by interpolating output values of peripheral elements. Therefore, by making determination on the basis of the green pixel values, it become possible to determine a scene change with high accuracy.

At step S116, the counter i is substituted by i+1, and at step S117, whether or not the counter i is more than or equal to a total number n of frames constituting the moving image Vd1, or whether determination of scene change has completed for all the frames in the moving image to be process is checked. In the case of the moving image Vd1 shown in FIG. 23, n is 12. Then, if the counter i is more than or equal to n, the flow proceeds to step S102, while on the other hand, if the counter i is less than n, the flow returns to step S112.

As a consequence of the above operation, all of frames $F_1$–$F_{12}$ diagonally shaded in FIG. 23 are subjected to determination of scene change, and divided into a plurality of frame groups each of which containing frames which are highly correlated, or which are regarded as having substantially the same scene characteristic.

Furthermore, according to the foregoing operation of main scene determination, since determination of scene change is made for each frame while taking green pixel values or information of only a part of plurality of color components into account, it is possible to improve the detection speed of scene change by omitting processings for other colors, and hence it is possible to conduct the moving image processing rapidly.

Figure 25:
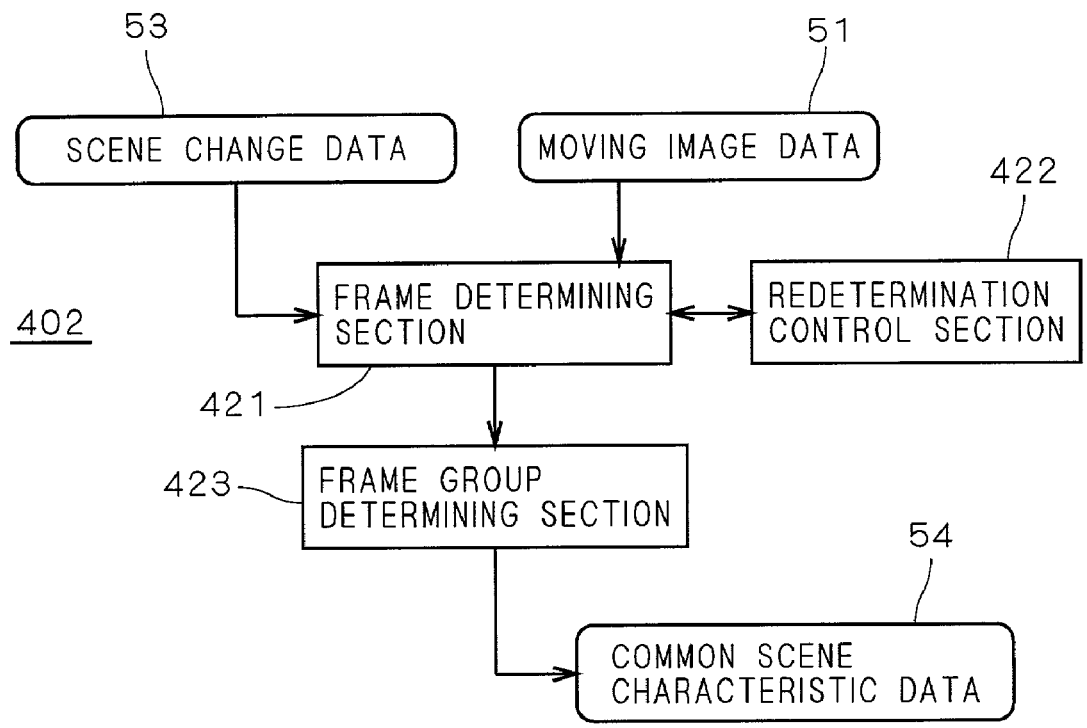
FIG. 25 is a block diagram of a functional configuration of a main scene determining section.
Figure 26:
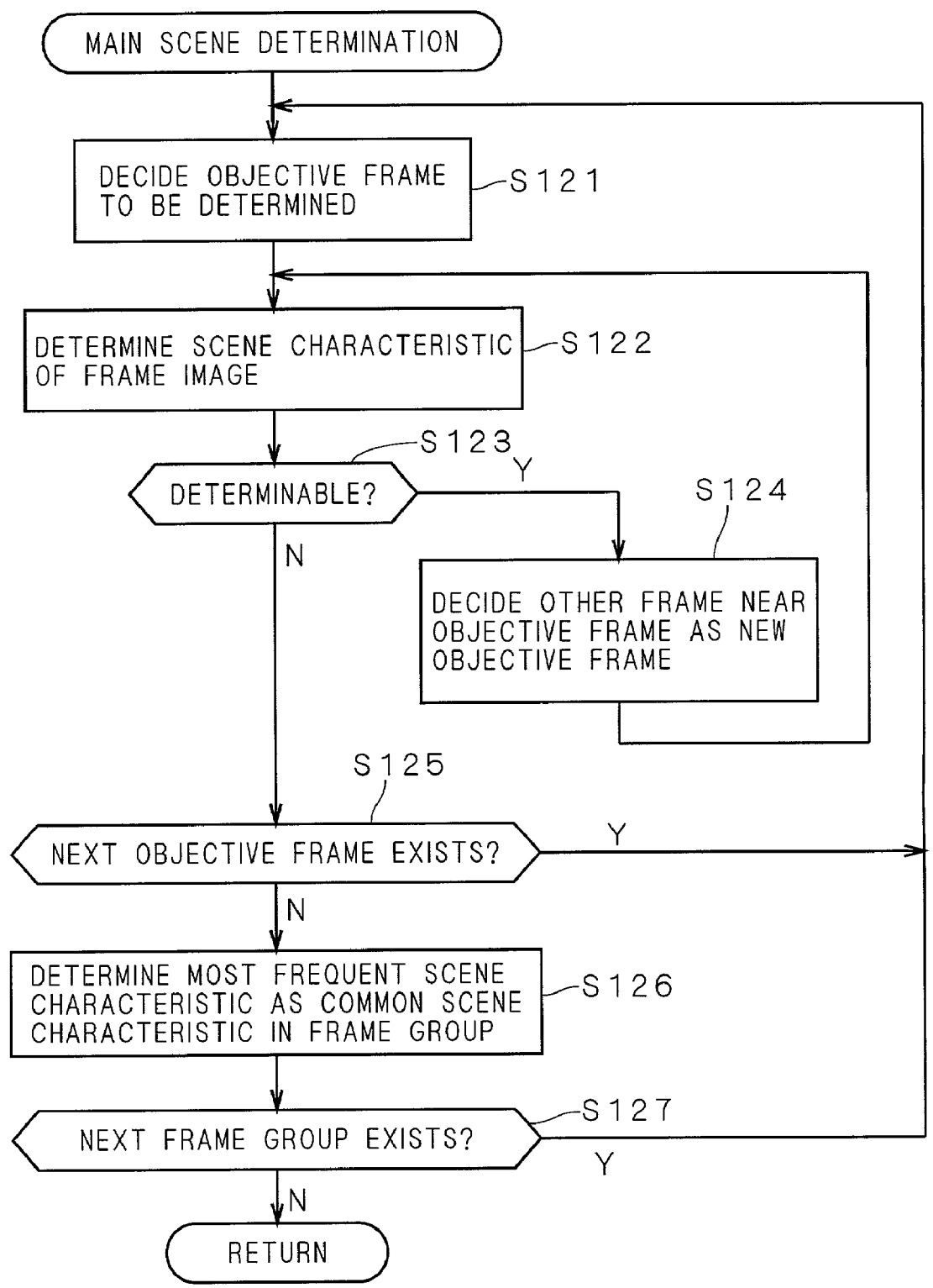
FIG. 26 is a flow chart showing an operation of main scene determination.
Figure 27:
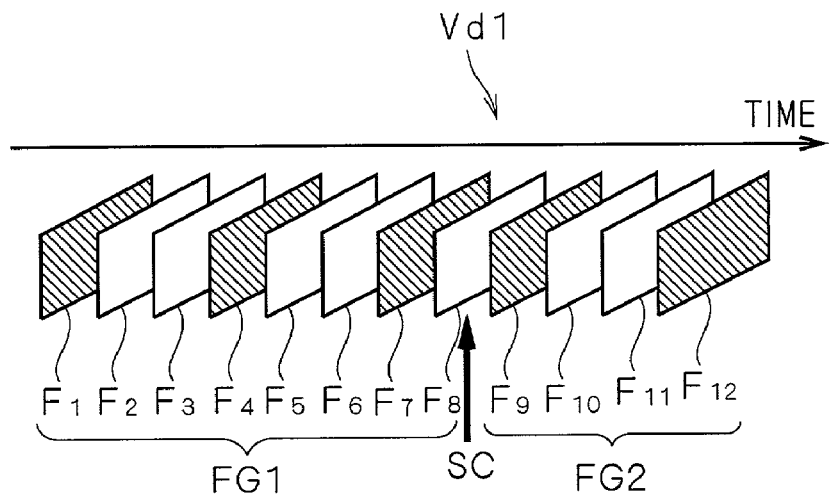
FIG. 27 is a view for explaining the main scene determination.
Figure 28:
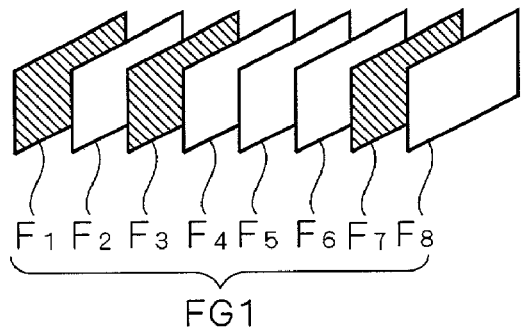
FIG. 28 is a view for explaining redetermination.
Figure 29:
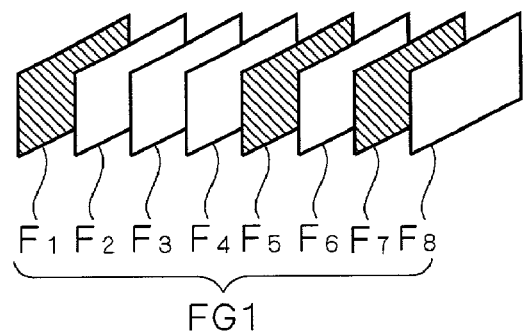
FIG. 29 is a view for explaining the redetermination.

FIG. 25 is a block diagram showing details of the function of the main scene determining section 402 and FIG. 26 is a flow chart showing the operation of the main scene determination. And FIGS. 27 to 29 are views for explaining the main scene determination.

At steps S121–S125, a frame determining section 421 makes the scene determination on part of the frame group FG10 on the basis of scene change data 53 from the preliminary scene determining section 401 and the moving image data 51. In this context, the scene determination refers to determination of characteristic of image (that is, scene characteristic represented by the image) and corresponds to, for example, sunset determination, color fog determination, contrast determination and the like disclosed in Japanese Unexamined Patent Publication JP-A 11-298736 (1999).

More specifically, an objective frame which is to be determined is decided at step S121, and scene determination of the objective frame is performed at step S122. As a result of this, a scene characteristic represented by the objective frame is acquired. In the above scene determination, also the case where it is impossible to discriminate the scene is determined, and hence the determination result may indicate indiscriminable rather than a scene characteristic.

In the case where a determination result other than indiscriminable is acquired in the scene determination (that is, a determination result indicating a scene characteristic is obtained), whether or not it is possible to decide a frame after a predetermined time as a next objective frame is checked at step S125, and if it is possible to decide a next object frame, the flow returns to step S121.

As a consequence of the operation as described above, frames are scatteringly sampled at constant time intervals, for example, for every 1 second with respect to the frame group FG10. To be more specific, as shown by the parallel diagonal lines in FIG. 27, three frames $F_1$, $F_4$, $F_7$ are sequentially signified and subjected to scene determination.

Also, it is possible to sample a predetermined number of frames, for example, 3 frames for each frame group. In this case, it is preferred that time intervals of 3 frames are equal to each other.

Figure 24:
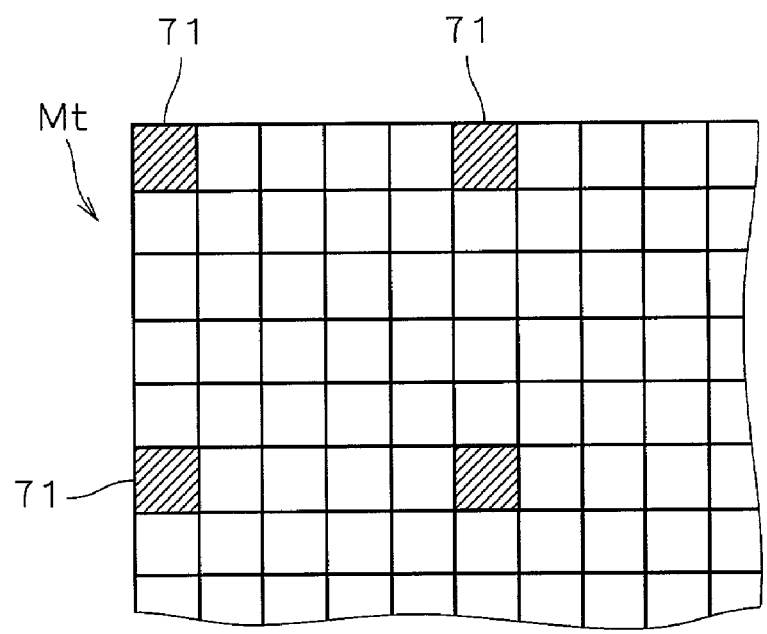
FIG. 24 is a view showing a pixel arrangement.

Furthermore, in the scene determination for each objective frame, as is the case of the preliminary scene determination shown in FIG. 24, pixel values of pixels at predetermined intervals in the objective frame are acquired and the scene determination is performed by using only these pixel values.

If it is determined to be indiscriminable in the scene determination, another frame in the vicinity of the objective frame is decided as a new objective frame at steps S123, S124 by a redetermination control section 422, and then the flow returns to step S122 where redetermination is performed by the frame determining section 421. For instance, if frame $F_4$ is determined to be indiscriminable in FIG. 27, one frame $F_3$ in the vicinity of frame $F_4$ is decided as a new object frame as shown in FIG. 28 fore executing redetermination.

If it is determined to be indiscriminable also for frame $F_3$, frame $F_5$ is determined to be a new objective frame as shown in FIG. 29, and further determination is executed. If a determination result indicating indiscriminable is obtained also in frame $F_5$, yet another frame in the vicinity of frame $F_4$ is subjected to determination.

In the above description, the term "indiscriminable" means that it is impossible to clearly determine the characteristic of the scene represented by the objective frame because a variety of determination parameter values derived from the objective frame do not belong to the range of determination parameters defined in correspondence with the determination results such as "high contrast", "low contrast", "under" and "over".

For example, under the backlight condition, the contrast become high and the center of the objective frame is darker than the vicinity, and in the case where the center is slightly darker than the vicinity, it is impossible to discriminate that the scene characteristic of the objective frame is "high contrast" or "backlight". Other typical examples that is likely to cause the result indicating indiscriminable include discrimination between "low contrast" and "under" and discrimination between "green fog" and "normal".

Of course, by adjusting the range settings of the determination parameters, it is possible to suppress or prevent the determination result from being indiscriminable, however, in the image processing apparatus 1, redetermination is performed in response to acquirement of the determination result indicating indiscriminable, so that acquirement of inaccurate determination result is prevented.

As a further concrete example, determination of color fog will be explained. In color fog determination, a hue histogram with regard to pixels having a lightness more than or equal to a predetermined value, and if more than or equal to 87% of the pixels concentrate in a first hue range, the determination result indicates "normal" (that is, object of a certain color) rather than "color fog". Then, if more than or equal to 83% and less than 87% of the pixels concentrate in the first hue range, the determination result indicates "indiscriminable".

Furthermore, if more than or equal to 83% of the pixels concentrate in the first hue range and more than or equal to 82% of the pixels concentrate in a second hue range (the second range is larger than the first range), it is determined that "color fog" occurs. If more than or equal to 78% and less than 82% of the pixels concentrate in the second range, the determination result indicates "indiscriminable", while if less than 78% of the pixels concentrate in the second range, it is determined that a color fog does not occur.

In the manner as described above, scene determination is performed by comparing the values of determination parameters principally derived from the image with the thresholds, and such a determination technique also applies to other kinds of determination such as "low contrast", "over", "under" and "sunset".

When a determination result other than indiscriminable is finally obtained for a plurality of frames of approximately constant time intervals in the frame group FG10 as a consequence of the processing from steps S121–S125 involving redetermination, a frame group determine section 423 determines a most frequent scene characteristic of the frame group FG10 as a common scene characteristic which is common to the frame group. The common scene characteristic thus determined is sent to the correcting section 403 as a common scene data 54.

After that, at step S127, whether a next frame group exists, that is, whether scene determination for all the frame groups in the moving image Vd1 has completed is checked. Then, if a next frame group exists, the flow returns to step S121, and the operation of steps S121–S126 is executed on the next frame group. For instance, in the moving image Vd1 shown in FIG. 27, upon completion of the main scene determination of the frame group FG10, the process shifts to the main scene determination of the next frame group FG20. After determination of the common scene characteristic of the frame group FG20, the flow proceeds to step S103 in FIG. 21 because a next frame group does not exists.

The operation of the above main scene determination will be further explained by referring to concrete determination results by the use of Table 6 and Table 7 below.

TABLE 6

| Frame number | Result of main scene determination |
|---|---|
| 1 | green fog |
| 4 | indiscriminable |
| 7 | normal |

TABLE 7

| Frame number | Result of main scene determination |
|---|---|
| 1 | green fog |
| 3 | green fog |
| 7 | normal |

Assuming that in the case where redetermination by steps S123, S124 is not executed, frames $F_1$, $F_4$, $F_7$ in the frame group FG10 are determined as "green fog", "indiscriminable", "normal", respectively, as shown in Table 6 by the operation of steps S121, S122, redetermination on frame $F_3$ is practically executed by steps S123, S124 at the time of determination on frame $F_4$. As a consequence of the above, if the determination result for frame $F_3$ is "green fog", the group of determination results as shown in Table 7 is obtained in the image processing apparatus by the processing of steps S121–S125.

Therefore, at step S126, "green fog" which is the most frequent scene is determined as a common scene characteristic of the frame group FG10.

After that, the main scene determination is performed also on for the frame group FG20 in the same manner as the frame group FG10, and results of the main scene determination for all the frame groups in the moving image Vd1 are obtained as shown in Table 8, for example.

TABLE 8

| Frame group number | Frame number | Result of main scene determination |
|---|---|---|
| 1 | 1–8 | green fog |
| 2 | 9–12 | low contrast |

According to the above-described operation of the main scene determination, since scene determination is made for a plurality of frames interposed between both ends in each frame group, it is possible to determine a common scene characteristic with high accuracy. Furthermore, even if the determination result indicates indiscriminable, the result can be corrected into a determination result other than indiscriminable by executing redetermination, so that it is possible to determine a common scene characteristic with higher accuracy.

Figure 30:
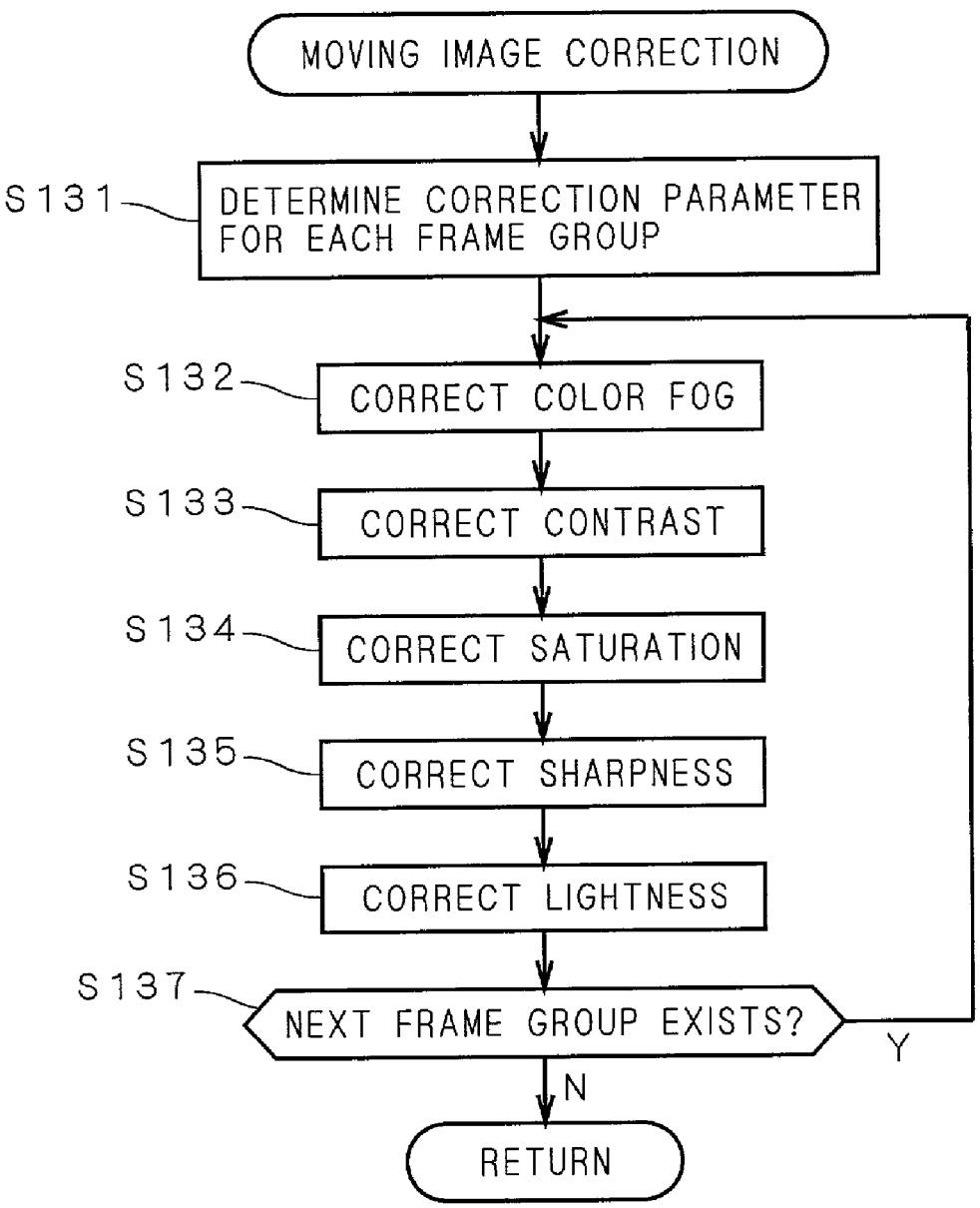
FIG. 30 is a flow chart showing an operation of correction of moving image.

FIG. 30 is a flow chart showing operation of moving image correction at step S103 in FIG. 21.

At step S131, a correction parameter (correction level) is determined for each frame group. In this context, for example, as shown in Table 9 below, correction levels for appropriately displaying the image are set for the scene characteristics "normal", "low contrast", "high contrast", "green fog" and "green fog and low contrast", respectively. And the correction level is determined according to the common scene characteristic determined by the operation of main scene determination. For example, the correction levels as shown in Table 10 are determined for the frame groups shown in FIG. 27.

TABLE 9

| Scene | Correction item | Correction level |
|---|---|---|
| normal | correction of color fog | 0 |
|  | correction of contrast | 5 |
|  | correction of saturation | 5 |
|  | correction of sharpness | 5 |
|  | correction of lightness | 5 |

TABLE 9-continued

| Scene | Correction item | Correction level |
|---|---|---|
| low contrast | correction of color fog | 0 |
|  | correction of contrast | 2 |
|  | correction of saturation | 4 |
|  | correction of sharpness | 4 |
|  | correction of lightness | 5 |
| high contrast | correction of color fog | 0 |
|  | correction of contrast | 8 |
|  | correction of saturation | 6 |
|  | correction of sharpness | 5 |
|  | correction of lightness | 5 |
| green fog | correction of color fog | 5 |
|  | correction of contrast | 5 |
|  | correction of saturation | 5 |
|  | correction of sharpness | 5 |
|  | correction of lightness | 5 |
| green fog & low contrast | correction of color fog | 5 |
|  | correction of contrast | 2 |
|  | correction of saturation | 4 |
|  | correction of sharpness | 4 |
|  | correction of lightness | 5 |

TABLE 10

| Frame group No. | Frame No. | Result of main determination | Correction item | Correction level |
|---|---|---|---|---|
| 1 | 1–8 | green fog | correction of color fog | 5 |
|  |  |  | correction of contrast | 5 |
|  |  |  | correction of saturation | 5 |
|  |  |  | correction of sharpness | 5 |
|  |  |  | correction of lightness | 5 |
| 2 | 9–12 | low contrast | correction of color fog | 0 |
|  |  |  | correction of contrast | 2 |
|  |  |  | correction of saturation | 4 |
|  |  |  | correction of sharpness | 4 |
|  |  |  | correction of lightness | 5 |

At steps S132–S136, correction of color fog, correction of contrast, correction of saturation, correction of sharpness and correction of lightness are performed on the basis of the correction levels determined at step S131. In this way, it is possible to conduct a uniform and appropriate image correction based on the common scene characteristic for the frame group.

At step S137, whether or not a next frame group exists, or whether image correction for all the frame groups in the moving image has completed is determined. Then, if a next frame group exists, the flow returns to step S132.

Furthermore, as for the above-described operation of moving image correction, in place of setting the correction levels of all the frames in each frame group uniformly as shown in Table 10, correction levels of frames in the vicinity of a scene change may be modified in accordance with correction levels of neighboring frame groups. To be more specific, as shown in Table 11, the correction levels of frames $F_7$–$F_{10}$ may be adjusted by linear interpolation in consideration of the correction levels of the neighboring frame groups.

TABLE 11

| Frame group No. | Frame No. | Result of main determination | Correction item | Correction level |
|---|---|---|---|---|
| 1 | 1–6 | green fog | correction of color fog | 5 |
|  |  |  | correction of contrast | 5 |

TABLE 11-continued

| Frame group No. | Frame No. | Result of main determination | Correction item | Correction level |
|---|---|---|---|---|
|  |  |  | correction of saturation | 5 |
|  |  |  | correction of sharpness | 5 |
|  |  |  | correction of lightness | 5 |
|  | 7 | green fog | correction of color fog | 4 |
|  |  |  | correction of contrast | 4.4 |
|  |  |  | correction of saturation | 4.8 |
|  |  |  | correction of sharpness | 4.8 |
|  |  |  | correction of lightness | 5 |
|  | 8 | green fog | correction of color fog | 3 |
|  |  |  | correction of contrast | 3.8 |
|  |  |  | correction of saturation | 4.6 |
|  |  |  | correction of sharpness | 4.6 |
|  |  |  | correction of lightness | 5 |
| 2 | 9 | low contrast | correction of color fog | 2 |
|  |  |  | correction of contrast | 3.2 |
|  |  |  | correction of saturation | 4.4 |
|  |  |  | correction of sharpness | 4.4 |
|  |  |  | correction of lightness | 5 |
|  | 10 | low contrast | correction of color fog | 1 |
|  |  |  | correction of contrast | 2.6 |
|  |  |  | correction of saturation | 4.2 |
|  |  |  | correction of sharpness | 4.2 |
|  |  |  | correction of lightness | 5 |
|  | 11–12 | low contrast | correction of color fog | 0 |
|  |  |  | correction of contrast | 2 |
|  |  |  | correction of saturation | 4 |
|  |  |  | correction of sharpness | 4 |
|  |  |  | correction of lightness | 5 |

As a result of this, it is possible to prevent the correction levels from becoming discontinuous at a boundary of frame groups, so that it is possible to render the entire moving image after correction a smooth image. Furthermore, even if some scene changes are detected erroneously, the adverse effect caused by that can be reduced.

Fourth Embodiment

Next, the case where the objective frame is not changed at the time of redetermination in the third embodiment will be explained as the fourth embodiment. In the fourth embodiment, the image processing apparatus 1 is as same as that of the third embodiment in its structure and operation except for the processing at the time of redetermination (step S124a) shown in FIG. 31.

Figure 32:
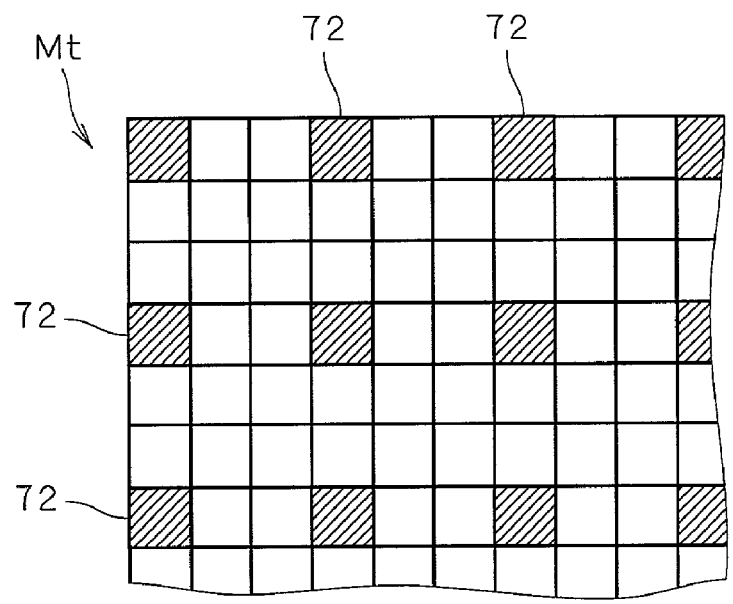
FIG. 32 is a view for explaining the redetermination.

FIG. 32 is a view showing pixels 72 to be used in scene determination, diagonally shaded, in the pixel arrangement Mt of an objective frame at the time of redetermination. It is to be noted that when the scene determination is performed at first on the objective frame, pixel values of the pixels 71 of every 5 pixels, as shown in FIG. 24, are used.

As shown in FIGS. 24 and 32, at the time of redetermination, under the control of the redetermination control section 422, the interval of pixels for use in scene determination (sample pitch) is reduced from 5 pixels to 3 pixels, thereby increasing the number of pixels to be used for the scene determination (step S124a). That is, scene determination is usually performed on the basis of values of a predetermined number of pixels, however, for a frame which has been determined as indiscriminable, redetermination is performed on the basis of values of pixels which are larger in number than the predetermined number.

As a result of this, at the time of redetermination, the scene determination is performed with higher accuracy than the first determination, so that it becomes possible to change the determination result indicating indiscriminable into a determination result representing a scene characteristic.

Of course there is a possibility that a determination result representing indiscriminable is obtained again in the redetermination, in such a case, however, the interval of pixels to be used for scene determination is further reduced so as to use much more pixels for the scene determination. As a result of this, it becomes possible to obtain a determination result other than indiscriminable almost securely.

Fifth Embodiment

Figure 33:
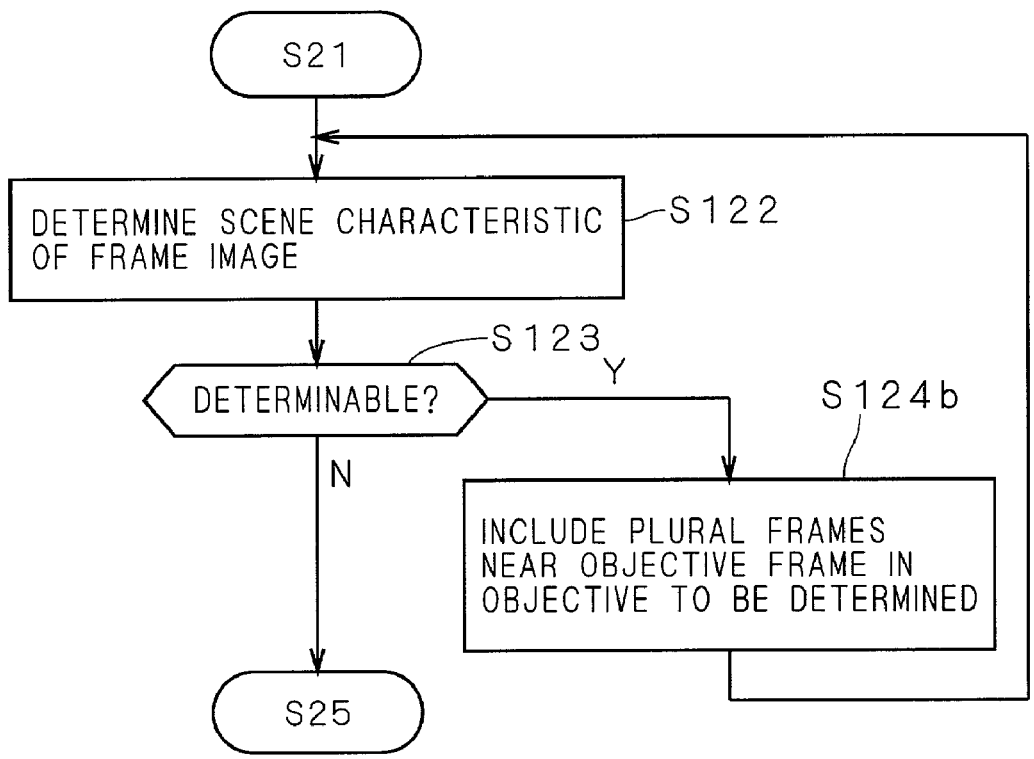
FIG. 33 is a flow chart showing an operation of redetermination in the fifth embodiment.

In the third embodiment, in the case where it is impossible to determine a scene of an objective frame, other frames in the vicinity of the objective frame is subjected to redetermination. In the following, the example where a plurality frames are used for scene determination at the time of redetermination will be explained as the fifth embodiment. Also in the fifth embodiment, the image processing apparatus 1 is as same as that of the third embodiment in its structure and operation except for the processing at the time of redetermination (step S124b) shown in FIG. 33.

Figure 34:
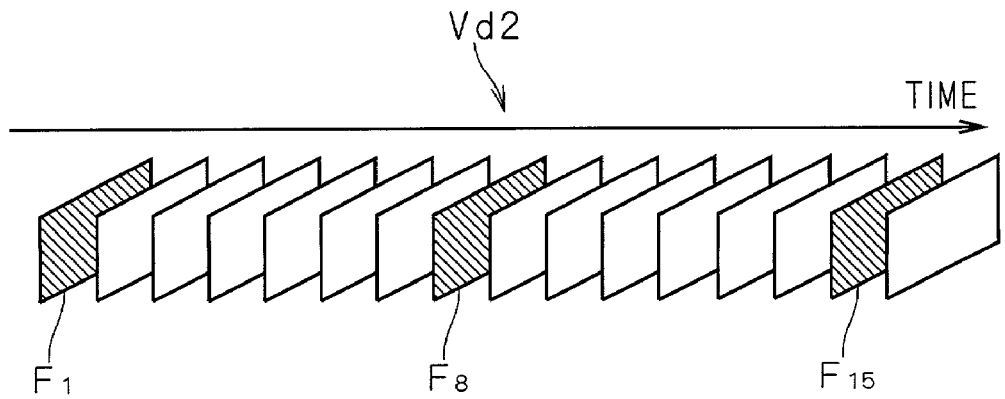
FIG. 34 is a view for explaining the redetermination.
Figure 35:
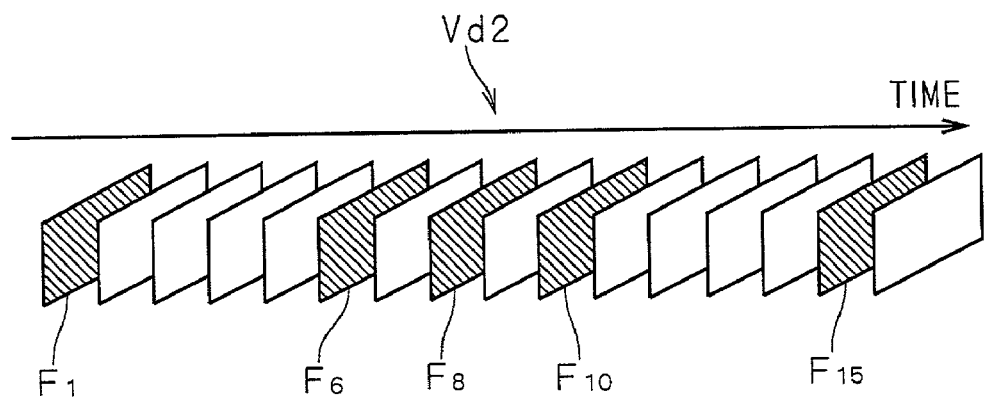
FIG. 35 is a view for explaining the redetermination.

FIGS. 34 and 35 are view for explaining the operation at the time of redetermination in the fifth embodiment. As shown in FIG. 34, in the situation that frames $F_1$, $F_8$, $F_{15}$ in a moving image Vd2 are sequentially decided as an objective frame, if the determination result for frame $F_8$ is indiscriminable, as shown in FIG. 35, a plurality of frames $F_6$, $F_{10}$ in the vicinity of frame $F_8$ are included in the object to be determined by the control of the redetermination control section 422 (step S124b).

To be more specific, a pixel vale in frame $F_8$ is substituted by a mean pixel value of the corresponding pixels in three frames $F_6$, $F_8$, $F_{10}$. As a result of this, it is possible to realize appropriate scene determination taking conditions of frames in the vicinity of the objective frame into consideration at the time of redetermination.

As a consequence of the above, the opportunity of obtaining a determination result indicating indiscriminable can be reduced. Of course there is a possibility that a determination result representing indiscriminable is obtained again in the redetermination, in such a case, however, redetermination is executed again with the use of increased number pixels. As a result of this, it becomes possible to obtain a determination result other than indiscriminable almost securely.

Also, a plurality of frames in the vicinity of the objective frame may be included into the object to be determined at the time of redetermination by means of other techniques. For example, it is also possible that a determination result is acquired for each of plurality of frames preceding and following the objective frame, and a determination result that was most frequently acquired except for indiscriminable is adopted as the determination result of the objective frame.

As described above, by executing redetermination on the basis of a plurality of frames in the vicinity of the frame for which a determination result indicating indiscriminable is obtained, it is possible to achieve appropriate redetermination.

Sixth Embodiment

In the sixth embodiment, redetermination is executed without changing the objective frame. As is described above, the processing of scene determination for an objective frame is as same as that of scene determination for a static image, and the technique of redetermination according to the sixth embodiment can be applied to scene determination in a static image.

Figure 31:
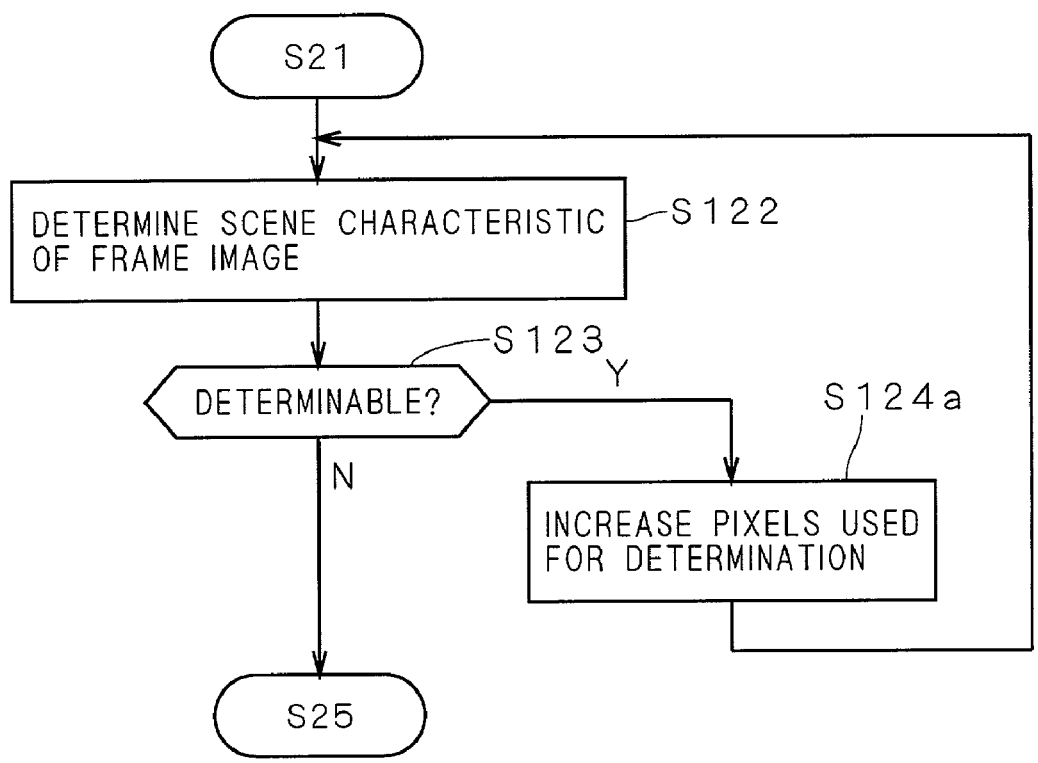
FIG. 31 is a flow chart showing an operation of redetermination in the fourth embodiment.

That is, by conducting the operation of steps S122–S124a in FIG. 31 by the image processing apparatus 1, it is possible to execute redetermination when the determination result for the static image is indiscriminable. In the redetermination, the number of pixels to be used for scene determination is increased as described above. Consequently, it is possible to execute scene determination of the static image with higher accuracy and with a minimum required time.

Furthermore, the processing of redetermination with respect to the objective frame in the sixth embodiment may be modified in various ways, and such a modified processing of redetermination can be applied to a static image insofar as the objective frame to be redetermined is not changed.

Figure 36:
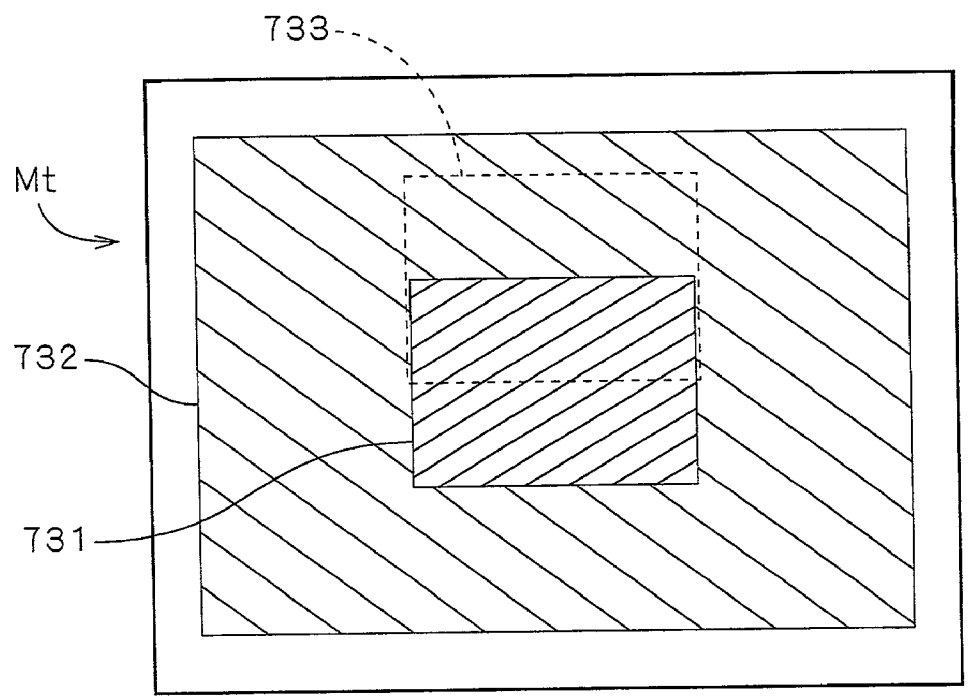
FIG. 36 is a view for explaining another example of redetermination in the sixth embodiment.

For instance, it is possible that in the pixel arrangement Mt of an objective frame shown in FIG. 36, scene determination is executed by using values of part of pixels in a region 731 for putting emphasis on the center of the frame, and wherein if a determination result indicating indiscriminable is obtained in the first scene determination, redetermination is executed while extending the region 731 into a region 732 by means of the redetermination control section 422.

In extending the region 731 into the region 732, the number of pixels to be used for scene determination may be kept constant (that is, intervals of pixels to be used for scene determination are elongated), or may be increased.

On the other hand, the position of the region 731 shown in FIG. 36 may be shifted to a region 733 by the redetermination control section 422 at the time of redetermination. Accordingly, scene determination is executed on the basis of the region slightly upward from the center of the objective frame at the time of redetermination. As a result of this, there arises a possibility that a determination result other than indiscriminable is obtained by redetermination even if the determination result for the center region 731 is indiscriminable. Of course, in the case where a determination result indicating indiscriminable is obtained by the redetermination, redetermination is executed again while further changing the region to be used for the determination.

As described above, by acquiring determination results including indiscriminable at the time of determining characteristics of an image and changing (preferably, increasing) the pixels to be used for calculation when the determination result indicates indiscriminable, it is possible to execute redetermination with respect to the same image appropriately.

Alternatives Related to Third to Sixth Embodiments

In the third to fifth embodiments, a moving image is corrected in non-real time (nonlinearly), however, if the amount of information per unit time of the moving image is small and hence the processing can be executed with sufficiently high speed, the image processing apparatus 1 may be configured so as to analyze and correct inputted moving images in real time.

In order to realize speedup, the various functional configurations shown in FIG. 20 and FIG. 25 may be constructed by special electric circuitry. In particular, by executing the repeated operations of the image processing by hardware, speedup can readily be realized. In the foregoing moving image correction, since the number of frames to be determined does not increase significantly even if redetermination is performed, an adverse affect on speedup is suppressed to minimum.

Furthermore, in the foregoing embodiments, the explanation was made for the case that objective frames subjected to scene determination are decided at constant frame intervals (or constant time intervals), however, objective frames may be arbitrarily decided. For instance, there is a possibility that the lightness is not stable in the vicinity of a scene change, so that objective frames may appropriately be decided in regions other than the vicinity of the scene change.

In the forgoing embodiments, when the determination result indicates indiscriminable, redetermination is performed while changing objective frames to be determined or accuracy of determination, however, provided that a scene characteristic represented by a frame group (that is, moving image) is determined on the basis of a plurality of determination results that are likely to indicate indiscriminable, the processing of redetermination may be omitted. For instance, in the case where a frame of indiscriminable exists between frames of which determination results are "green fog", the determination result indicating indiscriminable may be corrected into "green fog". In this way, it is possible to appropriately determine a scene characteristic represented by a frame group while taking indiscriminable into consideration.

In the foregoing third and fifth embodiments, at least one frame in the vicinity of the objective frame is subjected to determination at the time of redetermination. This can be comprehended that the interval of frames to be sampled is reduced in the vicinity of the objective frame. For instance, when a determination result indicating indiscriminable is obtained, in addition that the interval to the next objective frame is reduced, the determination result indicating indiscriminable may be corrected into other determination result by using a determination result of at least one frame.

As is already described, whether a determination result indicates indiscriminable or not depends of the setting of a threshold used for the determination. Therefore, it is not impossible to eliminate a determination result indicating indiscriminable according to the way of setting the threshold. In view of this, when a determination result indicating indiscriminable is obtained at the first determination, a temporary determination result other than indiscriminable is determined by using another threshold, whereby a determination result of other frame may be used for improving the reliability of the temporary determination result.

In the foregoing embodiments, the program is inputted to the image processing apparatus 1 which is a computer from the recording medium 9, however, the program may be inputted to the computer via a network. Of cause, the moving image data (static image data in the sixth embodiment) may be input/output via a network.

While the invention has been described in detail, the foregoing description is in all aspects illustrative and not restrictive. It is understood that numerous other modifications and variations can be devised without departing from the scope of the invention.

What is claimed is:

1. An image processing apparatus for processing a moving image consisting of a plurality of frames, said image processing apparatus comprising:
   (a) a setting element for detecting a scene change with regard to said moving image in accordance with change of each frame related to predetermined image information and setting frame sections with said scene change being a boundary therebetween;
   (b) a scene determining element for determining a scene characteristic for at least one frame interposed between frames on both ends of a frame section;
   (c) a deciding element for deciding a common scene characteristic representing a common characteristic in said frame section on the basis of a result of scene determination by said scene determining element, and
   (d) a correcting element for performing image correction with respect to each frame of said frame section on the basis of a correction coefficient set in accordance with said common scene characteristic with regard to said frame section.

2. The image processing apparatus according to claim 1, wherein
   said scene determining element determines a scene characteristic for frames other than frames in a vicinity of said scene change.

3. The image processing apparatus according to claim 1, wherein
   said setting element detects a scene change once for a plurality of frames, and sets said frame sections.

4. The image processing apparatus according to claim 1, further comprising:
   (e) a detecting element for detecting a short-time frame section which continues in a time period which is shorter than a predetermined threshold and having a common scene characteristic which is different from those of a preceding and a following frame sections; and
   (f) a replacing element, when common scene characteristics of said preceding and following frame sections substantially equal to each other, for replacing the common scene characteristic of said short-time frame section with said common scene characteristic of said preceding and said following frame section.

5. The image processing apparatus according to claim 1, wherein
   said scene determining element performs scene determination for more than or equal to 3 frames; and
   said deciding element decides said common scene characteristic with regard to said frame section on a most frequent scene in said more than or equal to 3 frames.

6. The image processing apparatus according to claim 1, wherein
   said correcting element adjusts said correction coefficient of a frame in said vicinity of said scene change in accordance with said correction coefficient of a neighboring frame section.

7. The image processing apparatus according to claim 1, wherein
   said predetermined image information is information of green color component.

8. An image processing method for processing a moving image consisting of a plurality of frames, said image processing method comprising the steps of:
   (a) detecting a scene change with regard to said moving image in accordance with change of each frame related to predetermined image information and setting frame sections with said scene change being a boundary therebetween;
   (b) determining a scene characteristic for at least one frame interposed between frames on both ends of a frame section;
   (c) deciding a common scene characteristic representing a common characteristic in said frame section on the basis of a result of scene determination at said step (b), and
   (d) performing image correction with respect to each frame of said frame section on the basis of a correction coefficient set in accordance with said common scene characteristic with regard to said frame section.

9. A computer-readable medium on which a program for processing a moving image consisting of a plurality of frames by using a processor is recorded, said computer-readable medium being installed in said processor to enable said processor to execute the steps of:
  (a) detecting a scene change with regard to said moving image in accordance with change of each frame related to predetermined image information and setting frame sections with said scene change being a boundary therebetween;
  (b) determining a scene characteristic for at least one frame interposed between frames on both ends of a frame section;
  (c) deciding a common scene characteristic representing a common characteristic in said frame section on the basis of a result of scene determination at said step (b), and
  (d) performing image correction with respect to each frame of said frame section on the basis of a correction coefficient set in a accordance with said common scene characteristic with regard to said frame section.

* * * * *